United States Patent
Toriyabe et al.

(10) Patent No.: US 8,047,543 B2
(45) Date of Patent: Nov. 1, 2011

(54) PRINTING SYSTEM, CONTROL METHOD, AND COMPUTER-READABLE STORAGE MEDIUM

(75) Inventors: Hiroyuki Toriyabe, Kawasaki (JP); Kazuhiko Ushiyama, Tokyo (JP)

(73) Assignee: Canon Kabushiki Kaisha, Toyko (JP)

( * ) Notice: Subject to any disclaimer, the term of this patent is extended or adjusted under 35 U.S.C. 154(b) by 267 days.

(21) Appl. No.: 12/436,989

(22) Filed: May 7, 2009

(65) Prior Publication Data

US 2009/0278308 A1    Nov. 12, 2009

(30) Foreign Application Priority Data

May 8, 2008    (JP) .................................. 2008-122182

(51) Int. Cl.
*B65H 39/10* (2006.01)
*B65H 43/00* (2006.01)

(52) U.S. Cl. ....................... 271/298; 271/176

(58) Field of Classification Search ............ 271/176, 271/298; 399/81, 124, 397, 405
See application file for complete search history.

(56) References Cited

U.S. PATENT DOCUMENTS

| | | | |
|---|---|---|---|
| 2004/0190057 A1* | 9/2004 | Takahashi et al. | 358/1.15 |
| 2007/0171455 A1* | 7/2007 | Tominaga | 358/1.14 |
| 2008/0042342 A1* | 2/2008 | Tominaga et al. | 271/298 |

FOREIGN PATENT DOCUMENTS

| | | |
|---|---|---|
| CN | 101004670 A | 7/2007 |
| CN | 101126970 A | 2/2008 |
| EP | 1818801 A2 | 8/2007 |

* cited by examiner

*Primary Examiner* — David H Bollinger
(74) *Attorney, Agent, or Firm* — Canon U.S.A., Inc. I.P. Division

(57) ABSTRACT

A method for controlling a printing system includes stacking a sheet printed by executing a job on a stacking unit provided inside a stacker, the stacker including a door that can be opened and closed, opening the door in a case where a predetermined instruction is input by a user, and in a case where the predetermined instruction is input while a job for stacking the sheet on the stacking unit, control to output the sheet discharged by executing the currently executed job on an output destination different from the stacking unit.

17 Claims, 15 Drawing Sheets

FIG.11

JOB STATUS — 1201

| ✓ | TYPE | JOB NAME | PAPER | PAGE | STATUS |
|---|---|---|---|---|---|
| 1 |  | JOB A CASE BINDING | A4 | 200 | UNDER CASE BINDING PROCESSING |
| 2 |  | JOB B CASE BINDING | A4 | 200 | WAITING TO BE PRINTED |
| 3 |  | JOB C STACKER | A3 | 800 | WAITING TO BE PRINTED |
| 4 |  | JOB D SADDLE STITCH BINDING | A4 | 060 | WAITING TO BE PRINTED |
| 5 |  | JOB E STACKER | A3 | 800 | WAITING TO BE PRINTED |
| 6 |  | JOB F STACKER | A4 | 060 | WAITING TO BE PRINTED |

CLOSE

SYSTEM MONITOR/SUSPEND ▶

PRINTING SYSTEM, CONTROL METHOD, AND COMPUTER-READABLE STORAGE MEDIUM

BACKGROUND OF THE INVENTION

1. Field of the Invention

The present invention relates to a printing system, a control method, and a computer-readable storage medium.

2. Description of the Related Art

In recent years, a printing system for the print on demand (POD) market has been discussed, which is capable of utilizing a stacker configured to remove a print product according to an instruction from an operator (United States Patent Application No. 2004/0190057 A1).

It is desired that a printing system like this has a high productivity as a product for the POD market. Accordingly, when print data to be printed with a printer is input in the printing system and an operator has issued an instruction for removing a print product from a stacker, it is useful if the print data can be continuously printed without placing the apparatus on suspension.

However, conventional methods have not dealt with a technique for implementing the above-described method. Under such circumstances, the above-described desired method has not been marketed yet and requires consideration.

SUMMARY OF THE INVENTION

The present invention is directed to a method for preventing stopping of printing of print data when the print data to be printed with a printer exists and if an instruction for removing a print product stacked on a stacker is input in this state.

According an aspect of the present invention, a printing system includes a stacking control unit configured to stack a sheet printed by executing a job on a stacking unit provided inside a stacker, the stacker including a sheet removal unit that can be opened and closed, a control unit configured to open the sheet removal unit when a predetermined instruction is input by a user, and an output control unit configured, when the user has input the predetermined instruction while a job for stacking the sheet on the stacking unit is carried out, to execute control for outputting the sheet to be discharged by executing the current job, to an output destination different from the stacking unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention, together with the description, serve to explain the principles of the present invention.

FIG. 11 illustrates an example of a job status screen displayed on the LCD unit of the touch panel unit according to the first exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
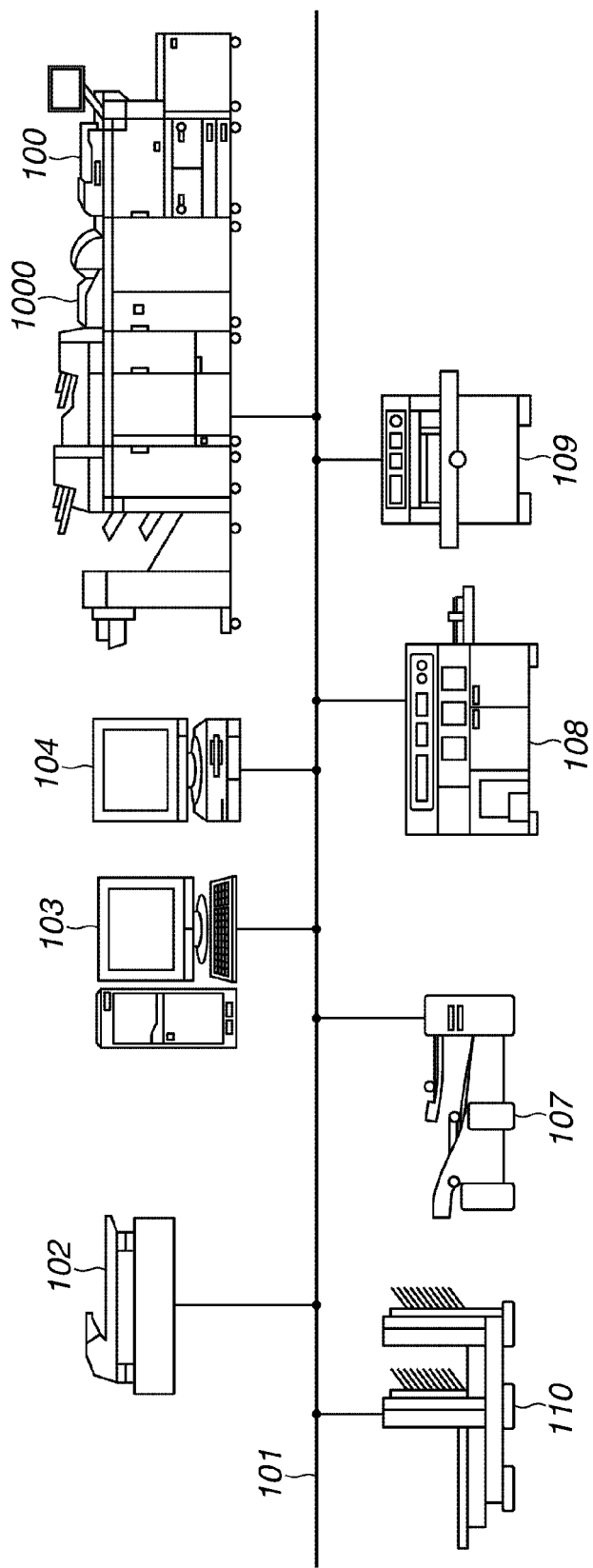
FIG. 1 illustrates an example of a POD system including a printing system according to a first exemplary embodiment of the present invention.

Now, a first exemplary embodiment of the present invention will be described in detail below. FIG. 1 illustrates an exemplary configuration of a POD system including a printing system according to the present exemplary embodiment. Referring to FIG. 1, the POD system includes a printing system 1000, which is an example of the printing system according to the present exemplary embodiment. In addition, the POD system includes a scanner 102, a server computer (personal computer (PC)) 103, and a client computer (PC) 104. The printing system 1000, the scanner 102, the PC 103, and the PC 104 are in communication with one another via a network 101.

In addition, the POD system includes a paper folding machine 107, a case binding machine 108, a cutting machine 109, and a saddle stitch binding machine 110. The above-described machines included in the POD system other than the saddle stitch binding machine 110 are connected to the network 101. Thus, the above-described machines of the POD system other than the saddle stitch binding machine 110 can execute data communication among them via the network 101.

Figure 2:
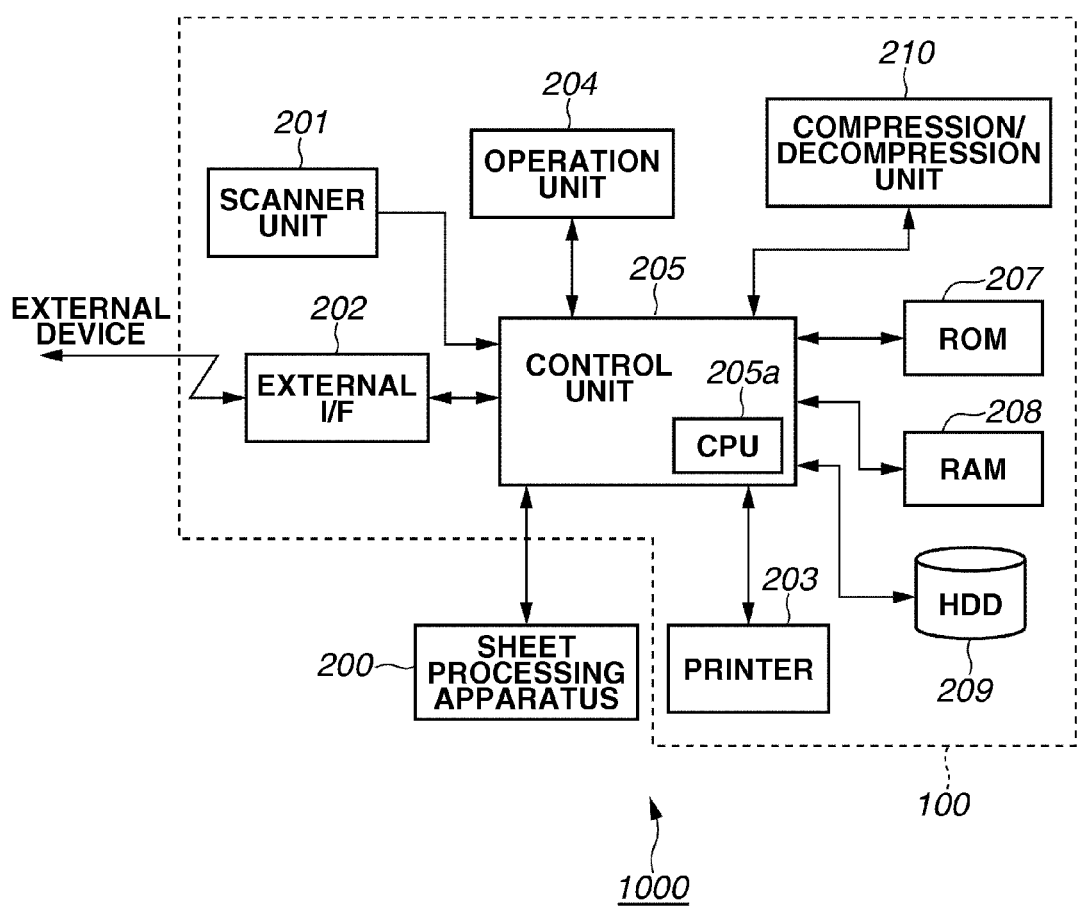
FIG. 2 is a block diagram illustrating an exemplary configuration of the printing system according to the first exemplary embodiment of the present invention.

FIG. 2 illustrates an exemplary configuration of the printing system 1000 according to the present exemplary embodiment. Referring to FIG. 2, the printing system 1000 includes a printing apparatus 100 and a sheet processing apparatus 200. In the present exemplary embodiment, a multifunction peripheral (MFP) having a plurality of functions, such as a copy function or a printer function, is used as an example of the printing apparatus 100. However, the present embodiment is not limited to this embodiment. More specifically, a single-function printing apparatus (printer) having a copy function or a printer function only can also be used. Components included in the printing system 1000 other than the sheet processing apparatus 200 are included within the printing apparatus 100. Various numbers of sheet processing apparatuses 200 can be connected to the printing apparatus 100.

The printing system 1000 can execute sheet processing on a sheet that has been printed with the printing apparatus 100 by using the sheet processing apparatus 200, which is connected to the printing apparatus 100. However, the printing apparatus 100 can include only the printing apparatus 100 without connecting the sheet processing apparatus 200 thereto.

The sheet processing apparatus 200 can communicate with the printing apparatus 100. The sheet processing apparatus 200 can execute sheet processing according to an instruction from the printing apparatus 100, as will be described in detail below. A scanner unit 201 scans an image of a document, converts the scanned document image into image data, and transfers the image data to other units. The external interface (I/F) 202 transmits and receives data to and from other apparatuses connected to the network 101. A printer 203 prints an image on a sheet based on input image data.

An operation unit 204, which is a user interface, includes a hard key input unit (key input unit) 402 (FIG. 4) and a touch panel unit (display unit) 401 (FIG. 4), which will be described in detail later below. The operation unit 204 receives an instruction from a user (user operation) input via the key input unit 402 and the touch panel unit 401. The touch panel unit 401 of the operation unit 204 displays various information.

A control unit 205 includes a central processing unit (CPU) (a print control unit and paper discharge control unit) 205a. The CPU 205a controls the entire processing and operation executed by each unit of the printing system 1000. More specifically, the CPU 205a controls an operation of the printing apparatus 100 and the sheet processing apparatus 200, which is connected to the printing apparatus 100.

A read-only memory (ROM) 207 stores various computer programs executed by the CPU 205a. The ROM 207 stores a program for executing various processing according to flow charts (to be described in detail below) performed by the control unit 205 and a display control program necessary for displaying various setting screens (to be described in detail below), for example. In addition, the ROM 207 stores a program for executing an operation for interpreting page description language (PDL) code data received from the server PC 103 and the client PC 104 and rasterizing the PDL data into raster image data which are performed by the control unit 205. Furthermore, the ROM 207 stores a boot sequence and font data.

A random access memory (RAM) 208 stores image data transmitted from the scanner unit 201 and the external I/F 202. Furthermore, the RAM 208 stores various programs and setting information loaded from the ROM 207. In addition, the RAM 208 stores various information about the sheet processing apparatus 200. For example, the RAM 208 stores the number of the sheet processing apparatuses 200 connected to the printing apparatus 100, information about a function of the sheet processing apparatus 200, and the order of connecting the sheet processing apparatuses 200. The CPU 205a controls the writing and loading of data to and from the RAM 208.

A hard disk drive (HDD) (storage unit) 209 includes a hard disk and a drive unit configured to write and load data on and from the hard disk. The HDD 209, which is used as a storage device, is a mass storage device that stores image data input via the scanner unit 201 and the external I/F 202 and compressed by a compression/decompression unit 210. In addition, the HDD 209 stores a memory setting value (recommended setting value) of each item, which will be described in detail later below. The control unit 205 executes control for printing the image data (print data) stored on the HDD 209 with the printer 203 according to a user instruction. Furthermore, the control unit 205 can transmit the image data stored on the HDD 209 to an external apparatus such as the server PC 103 via the external I/F 202 according to a user instruction. The compression/decompression unit 210 executes compression or decompression of image data stored on the RAM 208 and the HDD 209 by various compression methods such as Joint Bi-level Image Experts Group (JBIG) or Joint Photographic Experts Group (JPEG).

Figure 3:
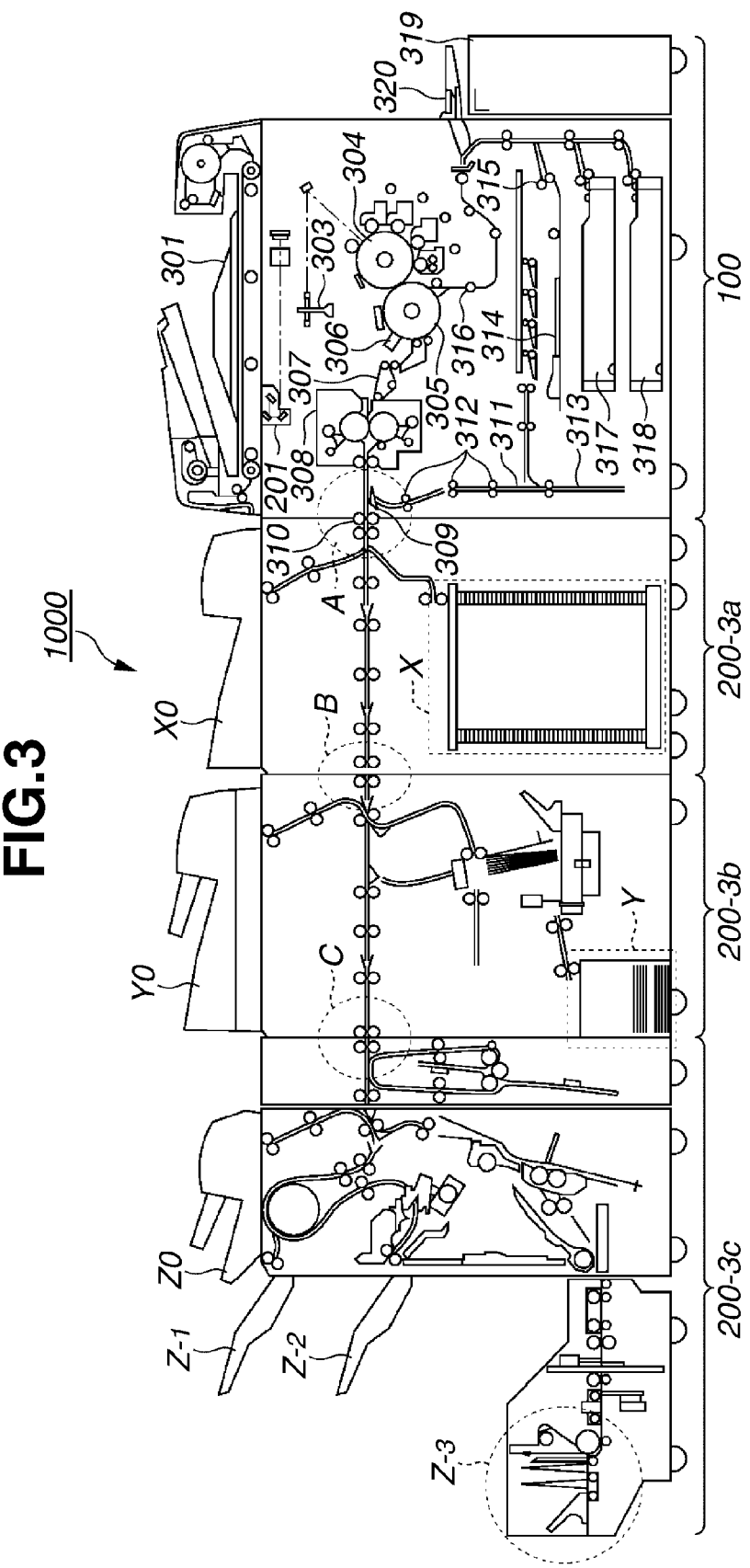
FIG. 3 is a cross section illustrating an example of a printing apparatus and a sheet processing apparatus connected thereto according to the first exemplary embodiment of the present invention.

FIG. 3 is a cross section of the printing apparatus 100 and the sheet processing apparatus 200, which is connected thereto, according to the present exemplary embodiment. Referring to FIG. 3, the printing apparatus 100 includes an auto document feeder (ADF) 301. The ADF 301 separates a sheet from the top of a sheet bundle set on a stacking surface of a document feeder tray sheet by sheet in order of page number. Then, the ADF 301 feeds the separated sheet onto a document positioning glass of the scanner unit 201. The sheet fed on the document positioning glass is then scanned and read by the scanner unit 201. The scanner unit 201 scans an image of a document fed on the document positioning glass and converts the scanned document image into image data by using an imaging device such as a charge-coupled device (CCD).

A laser beam that has been modulated according to image data is incident on a rotating polygonal mirror 303. The light reflected on the rotating polygonal mirror 303 then irradiates a photosensitive drum 304 via a reflecting mirror with reflection scanning light. A latent image formed on the photosensitive drum 304 in the above-described manner is developed by a toner. The toner image is transferred onto a sheet conveyed to a transfer drum 305. A full color image is transferred onto a sheet by serially executing the above-described image forming processing with yellow (Y), magenta (M), cyan (C), and black (k) toners.

The sheet on the transfer drum 305 having the full color image is then separated from the transfer drum 305 by a separation claw 306. Then the separated sheet is conveyed to a fixing device 308 by a pre-fixing conveyance device 307. The fixing device 308 includes a combination of rollers and a belt. A heat source such as a halogen heater is built within the fixing device 308. The fixing device 308 applies heat and pressure to the toner on the sheet having the toner image transferred thereon to fuse and fix the toner image.

A sheet discharge flapper 309 can oscillate around an oscillation shaft to regulate a sheet conveyance direction. More specifically, when the sheet discharge flapper 309 is turned in the clockwise direction in FIG. 3, the sheet is conveyed in a straight direction towards a portions A. Then, the sheet is discharged outside the apparatus by a sheet discharge roller 310.

The control unit 205 (FIG. 2) controls the printing apparatus 100 to execute one-sided printing by executing the above-described sequence. On the other hand, in forming an image on both sides of a sheet, the sheet discharge flapper 309 is turned in the counterclockwise direction in FIG. 3. In this case, the sheet is conveyed downward into a two-sided conveyance unit. The two-sided conveyance unit includes a reversing flapper 311, a reversing roller 312, a reversing guide 313, and a two-sided tray 314. The reversing flapper 311 oscillates around an oscillation shaft to regulate the conveyance direction of the sheet.

In processing a two-sided print job, the control unit 205 executes control for printing on a first side of the sheet with the printer 203 (FIG. 2) and conveying the printed sheet into the reversing guide 313 via the reversing roller 312. Then, the rotation of the reversing roller 312 is temporarily stopped in a state in which a trailing edge of the sheet is pinched by the reversing roller 312. Then, the reversing flapper 311 is turned in the clockwise direction in FIG. 3 and the reversing roller 312 is rotated in a reverse direction. Thus, the sheet is conveyed by a switch back operation. Under control of the control unit 205, the sheet is conveyed on the two-sided tray 314 in a state in which leading and trailing edges of the sheet are reversed.

The sheet temporarily stacked on the two-sided tray 314 in the above-described manner is then conveyed again to the registration roller 316 by the paper re-feed roller 315. At this time, the sheet is conveyed in a state in which a side opposite to the side printed in the above-described first transfer processing faces the photosensitive drum 304. Then, an image to be printed on the second side of the sheet is transferred onto the second side of the sheet by executing processing similar to the above-described processing.

When the images have been formed on both sides of the sheet, the sheet is subjected to fixing processing. Then, the sheet having the images fixed thereon is discharged from the printing apparatus 100 to the outside of the apparatus via the sheet discharge roller 310. Thus, the control unit 205 controls the printing apparatus 100 to execute two-sided printing by executing the above-described sequence.

In addition, the printing apparatus 100 includes a paper feed unit that contains sheets used in print processing. The paper feed unit includes paper feed cassettes 317 and 318, and the photosensitive drum 304, a paper feed deck 319, and a manual feed tray 320. In the present exemplary embodiment, each of paper feed cassettes 317 and 318 can contain five hundred sheets, for example. The paper feed deck 319 can contain five thousand sheets, for example. Various types of different sheets of various sizes and materials including a tab paper, which is used in the present embodiment, can be set on each of the paper feed cassette 317, the paper feed cassette 318, and the paper feed deck 319.

Various types of special sheets such as an overhead projector (OHP) sheet can be set on the manual feed tray 320. Each of the paper feed cassette 317, the paper feed cassette 318, the paper feed deck 319, and the manual feed tray 320 includes a paper feed roller. The sheets stacked on the paper feed unit are fed sheet by sheet as the paper feed roller rotates.

Now, the sheet processing apparatus 200 illustrated in FIG. 3 will be described in detail below. With respect to the sheet processing apparatus 200 of the printing apparatus 100 according to the present exemplary embodiment, various different types and various numbers of the sheet processing apparatuses 200 can be connected to the printing apparatus 100 and a sheet can be conveyed through an upstream apparatus to a downstream apparatus via a sheet conveyance path.

In the example illustrated in FIG. 3, a large-capacity stacker 200-3a, a gluing bookbinding machine 200-3b, and a saddle stitch binding machine 200-3c are connected to the printing apparatus 100 in this order from the printing apparatus 100. The sheet processing apparatuses 200 can be selectively utilized in the printing system 1000. Each of the sheet processing apparatuses 200 includes a sheet discharge unit. A user can remove a sheet that has been sheet-processed from the sheet discharge unit of each sheet processing apparatus 200. The sheet processing apparatus 200 is also referred to as a post-processing apparatus (post processor), which is employed to execute various post processing on a paper (sheet/print medium) printed with the printer 203.

Figure 5:
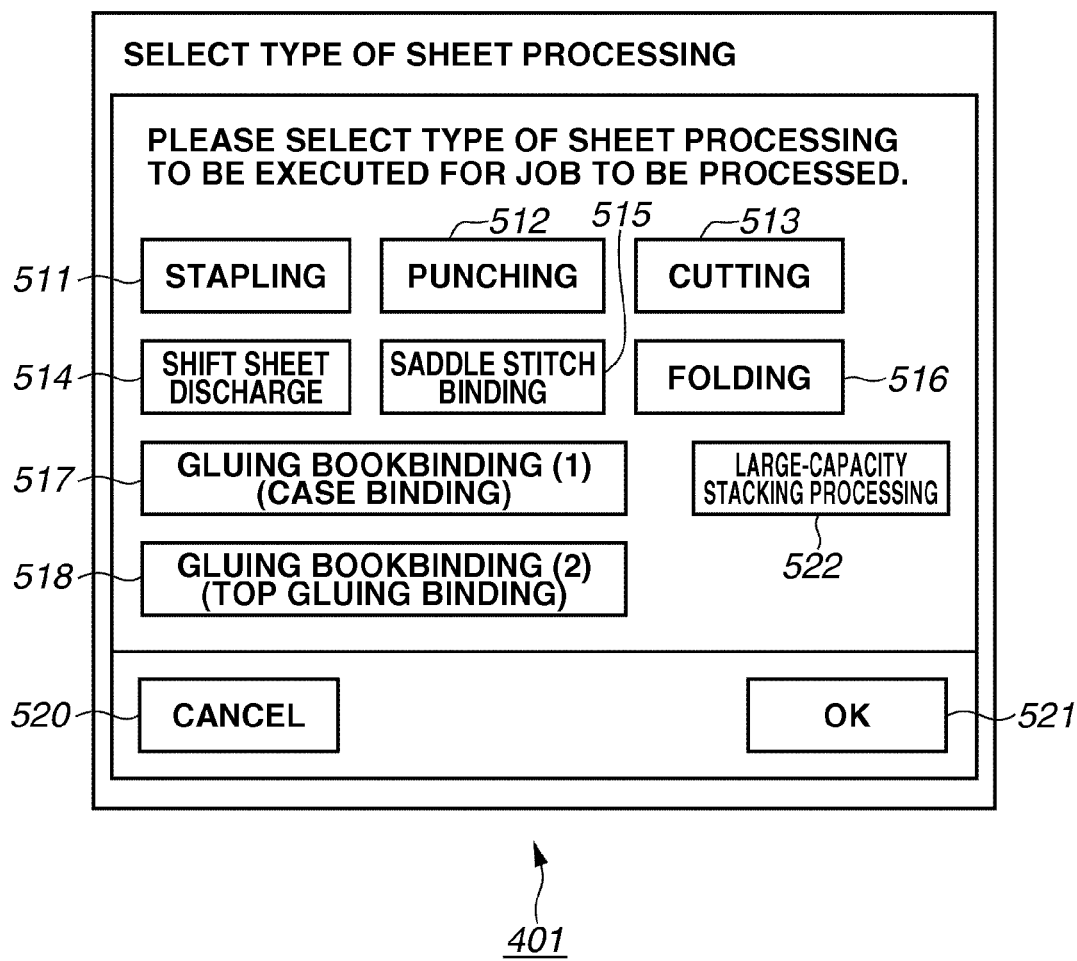
FIG. 5 illustrates an example of a screen displayed on a liquid crystal display (LCD) unit of a touch panel unit when a user presses a sheet processing setting button according to the first exemplary embodiment of the present invention.

The control unit 205 receives, via the operation unit 204 (FIG. 2), a request to execute sheet processing designated by the user from among candidates of sheet processing that can be executed on the sheet processing apparatus 200 connected to the printing apparatus 100, together with a print request. In this case, the user inputs a print request via a user interface screen (FIG. 5). The user interface screen illustrated in FIG. 5 will be described in detail later below.

When the control unit 205 has received a print request as to a job to be processed from the user via the operation unit 204, the control unit 205 executes the print processing of the job with the printer 203. Then, the control unit 205 executes control for conveying a sheet printed in the job to the sheet processing apparatus 200 configured to execute the sheet processing designated by the user. Then, the sheet processing apparatus 200 processes the sheet.

Suppose that the printing system 1000 has the system configuration illustrated in FIG. 3, for example, and that in the print job which has been requested from the user, mass stacking processing with the large-capacity stacker 200-3a has been instructed. Hereinbelow, a job like this is referred to as a "stacker job" while a job that is not a stacker job is referred to as a "non-stacker job". More specifically, a non-stacker job is a job that has been designated to discharge a print result 2003 on an output destination of the gluing bookbinding machine 200-3b and the saddle stitch binding machine 200-3c, which are the other sheet processing apparatuses 200 connected to the large-capacity stacker 200-3a.

Figure 6:
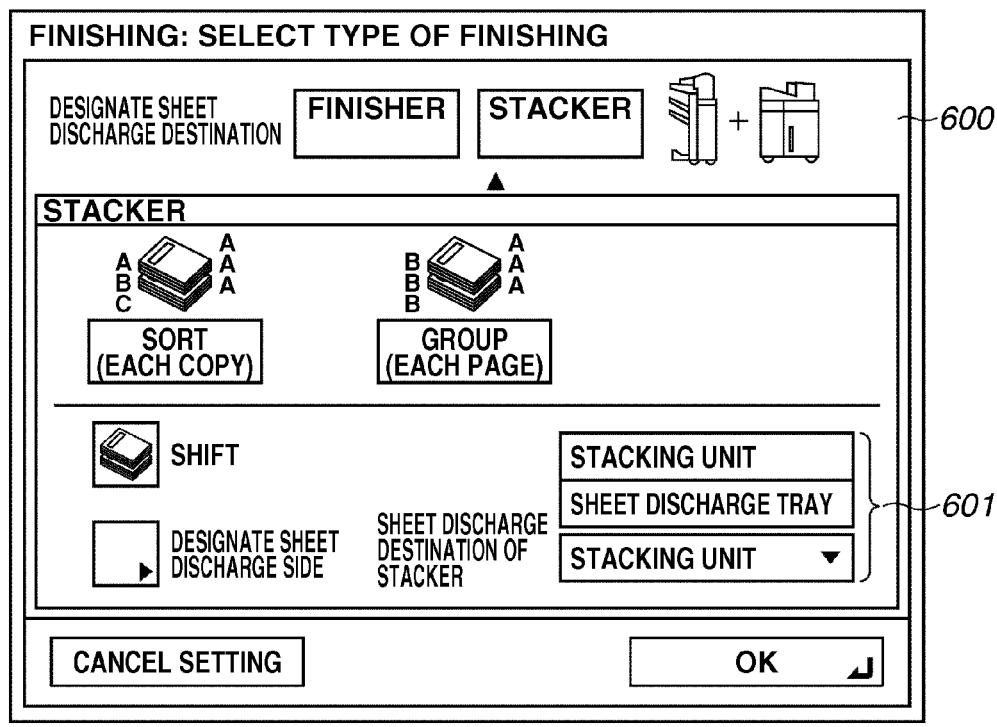
FIG. 6 illustrates an example of a sheet discharge destination designation screen, which is displayed on the LCD unit of the touch panel unit according to the first exemplary embodiment of the present invention.

FIG. 6 illustrates an example of a sheet discharge destination designation screen 600, which is displayed on an LCD unit of a touch panel unit 401 according to the present embodiment. In a stacker job, the user designates an output destination of the print result 2003, which is a print product, via a sheet discharge destination specification field 601 of the sheet discharge destination designation screen 600 (FIG. 6). Hereinbelow, the "output destination" is also referred to as a "sheet discharge destination". The sheet discharge destination designation screen 600 is displayed when a print request is received, for example.

In processing the stacker job in the printing system 1000 (FIG. 3), the control unit 205 executes control for conveying a sheet of the job printed by the printing apparatus 100 into the large-capacity stacker 200-3a via a point A (FIG. 3). Then, the control unit 205 causes the large-capacity stacker 200-3a to perform stacking processing of the job. Then, the control unit 205 stores print product of the job stacked by the large-capacity stacker 200-3a onto a sheet discharge destination X, which is an output destination inside the large-capacity stacker 200-3a, without conveying the same to other apparatuses (downstream apparatuses).

The user can remove the print product directly from the sheet discharge destination X (FIG. 3). Accordingly, it becomes unnecessary for the user to perform an operation for conveying the sheet to either of sheet discharge destinations Z-1, Z-2, and Z-3 (FIG. 3), which are most downstream of the sheet conveyance direction, and removing the print product from either of the sheet discharge destinations Z-1 through Z-3. In the present exemplary embodiment, the control unit 205 executes control for processing a print job, in which mass stacking processing as a stacker job has been instructed by the user operating a button 522 on the user interface screen (FIG. 5).

Suppose that in the example illustrated in FIG. 3, the print job which has been requested by the user, is a job in which it is instructed to execute sheet processing (either gluing binding processing in case binding processing, or top gluing binding processing) with the gluing bookbinding machine 200-3b. This job is hereinafter referred to as a "gluing binding job". In processing a gluing binding job in the printing system 1000 (FIG. 3), the control unit 205 executes control for conveying the sheet printed with the printing apparatus 100 into the gluing bookbinding machine 200-3b via points A and B (FIG. 3) in this order. Then, the control unit 205 executes the gluing binding processing of the job with the gluing bookbinding machine 200-3b.

Then, the control unit 205 stores a print product of the job, which has been gluing-bound by the gluing bookbinding machine 200-3b, on a sheet discharge destination Y inside the gluing bookbinding machine 200-3b as it is, without conveying the same to other apparatus (downstream apparatus). An already printed cover can be used in executing the case binding processing. In this case, the cover sheet is set on a tray Y0.

In the present exemplary embodiment, the control unit 205 executes control for processing a print job, whose gluing binding processing has been instructed by the user by pressing a button 517 or a button 518 on the user interface screen illustrated in FIG. 5, as a gluing binding job.

Suppose that in the printing system 1000 (FIG. 3) having the above-described configuration, a print job has been requested by the user, is a job in which it is instructed by the user to execute sheet processing with the saddle stitch binding machine 200-3c. The sheet processing by the saddle stitch binding machine 200-3c includes saddle stitch binding processing, punching processing, cutting processing, shift discharge processing, and folding processing. The this job is hereinafter referred to as a "saddle stitch binding job".

In executing a saddle stitch binding job in the printing system 1000 (FIG. 3), the control unit 205 executes control for conveying the sheet printed by the printing apparatus 100 into the saddle stitch binding machine 200-3c via points A, B, and C in this order. Then, the control unit 205 executes the sheet processing of the job with the saddle stitch binding machine 200-3c. Then, the control unit 205 stores a print product of the saddle stitch binding job, which has been sheet-processed by the saddle stitch binding machine 200-3c, on a sheet discharge destination of the saddle stitch binding machine 200-3c.

The saddle stitch binding machine 200-3c has an inserter tray Z0, which feeds a previously printed sheet. A previously printed cover sheet, for example, is set on the inserter tray Z0. The sheet fed from the inserter tray Z0 is merged with a sheet fed from the printing apparatus 100. More specifically, the saddle stitch binding machine 200-3c executes post processing for merging the sheets into one bundle.

The saddle stitch binding machine 200-3c includes a plurality of sheet discharge destinations Z-1, Z-2, and Z-3. That is, the present exemplary embodiment can discharge the sheet on either of the sheet discharge destinations Z-1 through Z-3 differently in each type of sheet processing that can be executed by the saddle stitch binding machine 200-3c. The sheet discharge destination Z-3 is a sheet discharge destination booklet holding unit for stacking a print product that has been subjected to the saddle stitch binding processing by the saddle stitch binding machine 200-3c. The sheet discharge destination Z-2 is a sheet discharge destination stack tray for stacking a print product on which either stapling, punching, or folding has been executed by the saddle stitch binding machine 200-3c. The sheet discharge destination Z-1 is a sheet discharge destination sample tray for stacking a print product as it is without executing the above-described sheet processing thereon.

In the present exemplary embodiment, the control unit 205 executes control for processing a print job, whose sheet processing by the saddle stitch binding machine 200-3c has been instructed by the user pressing either of buttons 511 through 516 on the user interface screen illustrated in FIG. 5, as a saddle stitch binding job.

Furthermore, in the present exemplary embodiment, the large-capacity stacker 200-3a includes an escape tray X0. The escape tray X0 is an external output destination (sheet discharge destination). If a sheet that is not to be used as an end product has been conveyed from an upstream apparatus, the sheet is discharged on the escape tray X0. More specifically, if feeding of a sheet has already started when print stop such as jamming of a conveyed sheet (hereinafter simply referred to as a "paper jam") occurs (retaining sheet existing within the apparatus), such a sheet can be discharged on the escape tray X0. Further, a double-fed sheet can be discharged. With the above-described configuration, the present exemplary embodiment can prevent conveying a jammed sheet or a double-fed sheet to a downstream apparatus and discharge the same to the outside of the apparatus.

Figure 4:
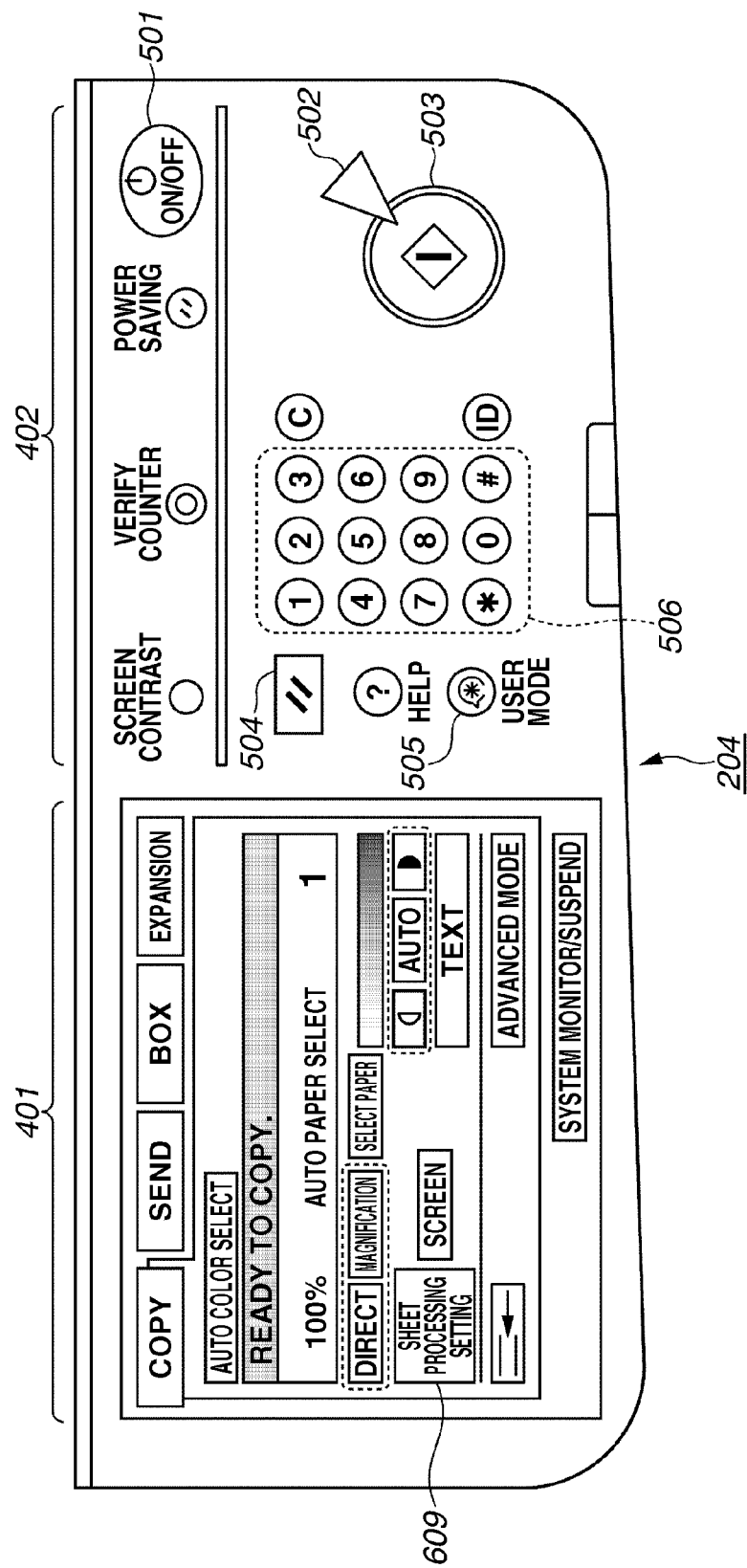
FIG. 4 illustrates an exemplary external appearance of an operation unit of the printing apparatus according to the first exemplary embodiment of the present invention.

FIG. 4 illustrates an exemplary external appearance of the operation unit 204 of the printing apparatus 100 according to the present exemplary embodiment. Referring to FIG. 4, the operation unit 204 includes the touch panel unit 401 and the key input unit 402. The touch panel unit 401 includes an LCD unit and a transparent electrode provided thereon. The touch panel unit 401 displays various setting screens via which the user can input an instruction. The touch panel unit 401 has a function for displaying various screens and an instruction input function for receiving a user instruction.

The key input unit 402 includes a power key 501, a start key 503, a stop key 502, a guide key 504, a user mode key 505, and numeric keypads 506. The start key 503 can be operated by the user to instruct the printing apparatus 100 to start a copy job or a data transmission job. The numeric keypads 506 can be operated to enter a numeric value for a setting such as the number of prints.

The control unit 205 (FIG. 2) controls the printing system 1000 to execute various processing according to a user instruction received via various screens displayed on the touch panel unit 401 or via the key input unit 402. The touch panel unit 401 displays various mode buttons for setting an operation mode such as a copy mode, a SEND mode, a box mode, and an extension mode. In addition, the touch panel unit 401 displays various instruction buttons for setting a print magnification rate and various setting of a sheet. A publicly known buttons can be used as the above-described instruction buttons. Accordingly, the detailed description thereof is omitted here. In the following description, the operation performed when the user has designated a sheet processing setting button 609 will be described.

An example of a setting screen displayed on the touch panel unit 401 of the operation unit 204 of the printing apparatus 100 according to the present embodiment will be described below. FIG. 5 illustrates an example of a screen displayed on the LCD unit of the touch panel unit 401 when the user has pressed the sheet processing setting button 609. The user can select the type of sheet processing to be executed on the sheet processing apparatus 200, which can be utilized in the printing system 1000, by selecting a button or a soft key displayed on the screen.

Referring to FIG. 5, among the buttons and soft keys displayed on the touch panel unit 401, the button 511 can be operated by the user to issue an instruction for executing stapling. The button 512 can be operated to issue an instruction for executing punching. The button 513 can be operated to issue an instruction for executing cutting. The button 514 can be operated to issue an instruction for executing shift sheet discharge processing. The button 515 can be operated to issue an instruction for executing saddle stitch binding. The button 516 can be operated to issue an instruction for executing folding. The button 517 can be operated to issue an instruction for executing gluing binding (case binding). The button 518 can be operated to issue an instruction for executing gluing binding (top gluing binding). The button 522 can be operated to issue an instruction for executing mass stacking processing. When the user presses a cancel button 520, the user can cancel all settings. When the user presses an OK button 521, the user can finally enter and enable the setting.

Figure 7:
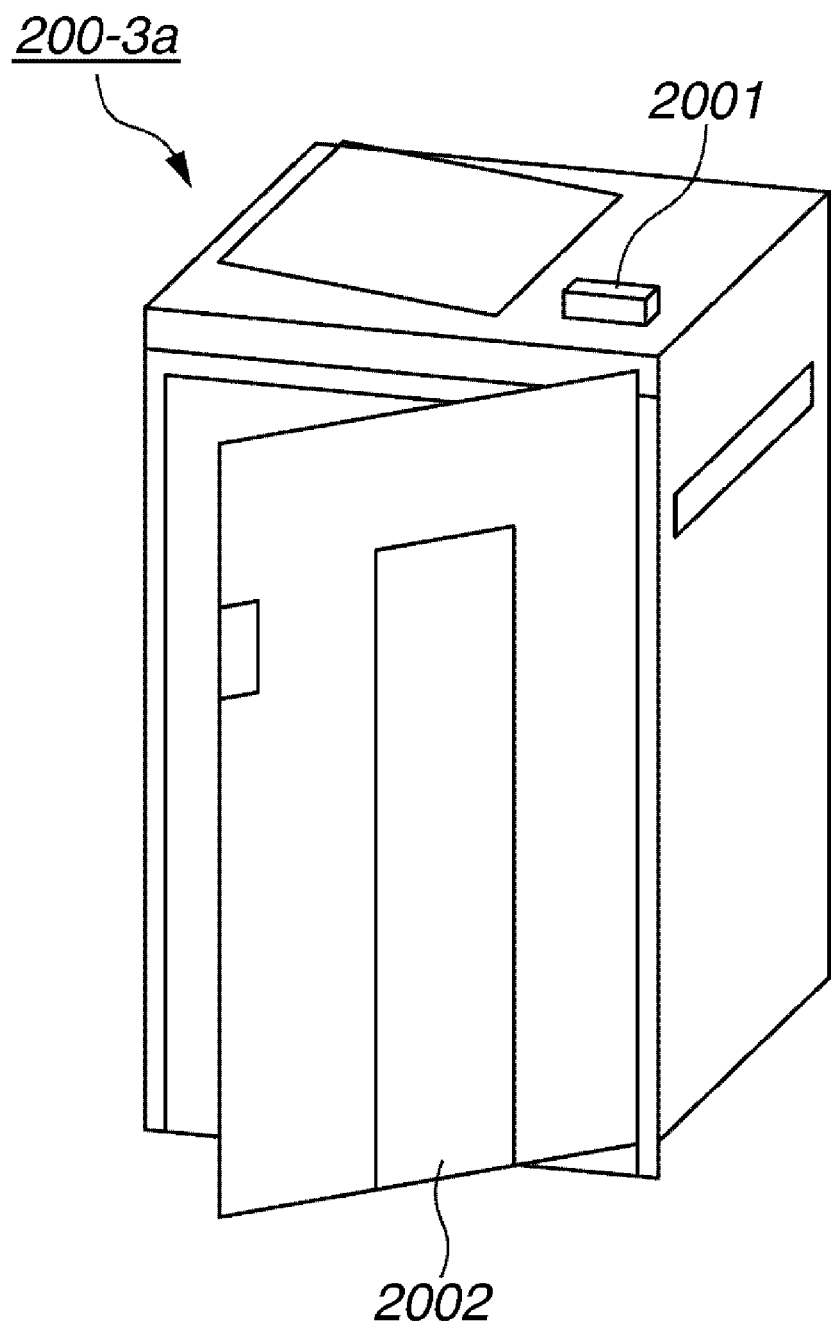
FIG. 7 illustrates an exemplary external appearance of a large-capacity stacker according to the first exemplary embodiment of the present invention.

Now, the large-capacity stacker 200-3a (FIG. 3), which is a stacker according to the present embodiment, will be described in detail below with reference to FIG. 7. FIG. 7 illustrates an exemplary external appearance of the large-capacity stacker 200-3a. The large-capacity stacker 200-3a includes a removal instruction key 2001, which is a user interface, on its top portion. In addition, the large-capacity stacker 200-3a includes a front cover 2002 on the front.

Figure 8:
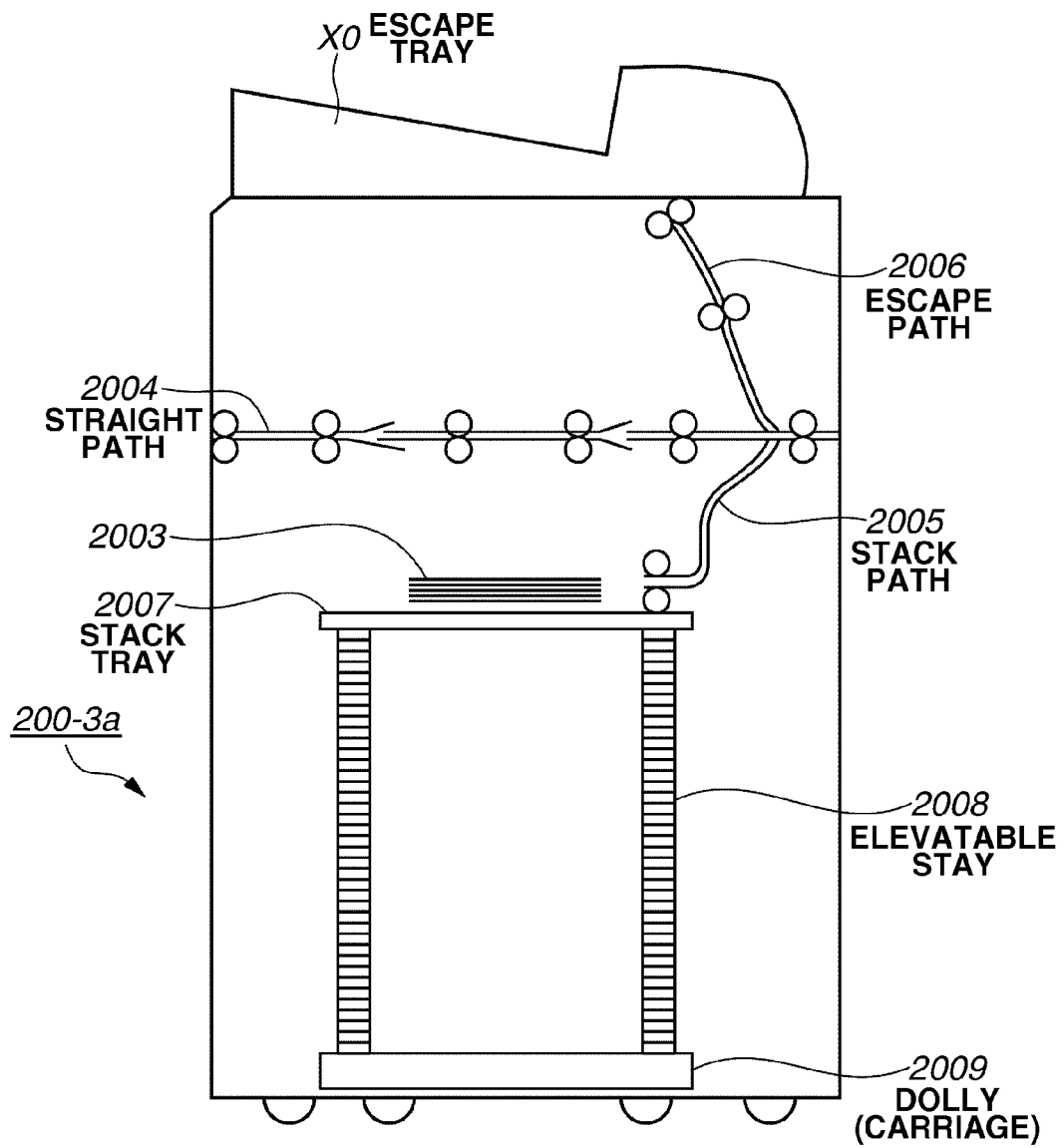
FIG. 8 is a cross section of an exemplary large-capacity stacker on a plane parallel to one side of the stacker according to the first exemplary embodiment of the present invention.

FIG. 8 is a cross section of the large-capacity stacker 200-3a on a plane parallel to one side thereof according to the present embodiment. Referring to FIG. 8, the print result 2003 is conveyed through either of a straight path 2004, a stack path 2005, and an escape path 2006. The straight path 2004 is a conveyance path leading to the gluing bookbinding machine 200-3b (FIG. 3). The stack path 2005 is a conveyance path leading to a stack tray 2007 (corresponding to the sheet discharge destination X provided inside the large-capacity stacker 200-3a in FIG. 3). The escape path 2006 is a conveyance path leading to the escape tray X0. An elevatable stay 2008 can be elevated according to the quantity of the print results 2003 stacked on the stack tray 2007. The user can remove the print result 2003 by withdrawing a dolly (carriage) 2009 to the outside of the large-capacity stacker 200-3a.

When the user has entered an instruction for removing the print result 2003 by pressing the removal instruction key 2001, the large-capacity stacker 200-3a executes the following operation. More specifically, the large-capacity stacker 200-3a executes at least one of operations necessary for removing the print result 2003, namely, an operation necessary for carrying the print result 2003 on the dolly 2009 and an operation necessary for opening the front cover 2002.

At least one of an operation for moving the stack tray 2007 towards the dolly 2009 or a lock releasing operation for releasing the locked state of the front cover 2002 is executed as the above-described operation necessary for removing the print result 2003. A condition for selecting one operation from among the above-described operations can be previously determined. It is also useful if the user can set and select an operation to be executed at a particular time. Furthermore, it is also useful if the operation to be executed is set according to each instruction for removing the print result 2003 by the user.

Now, primary processing will be described in detail below which is executed in the control (the control includes print control and control on the sheet discharge destination) of a print job executed in the printing system 1000. In the printing system 1000, a plurality of sheet processing apparatuses 200 is connected to the printing apparatus 100 as illustrated in FIG. 3 with reference to FIG. 9.

Figure 9:
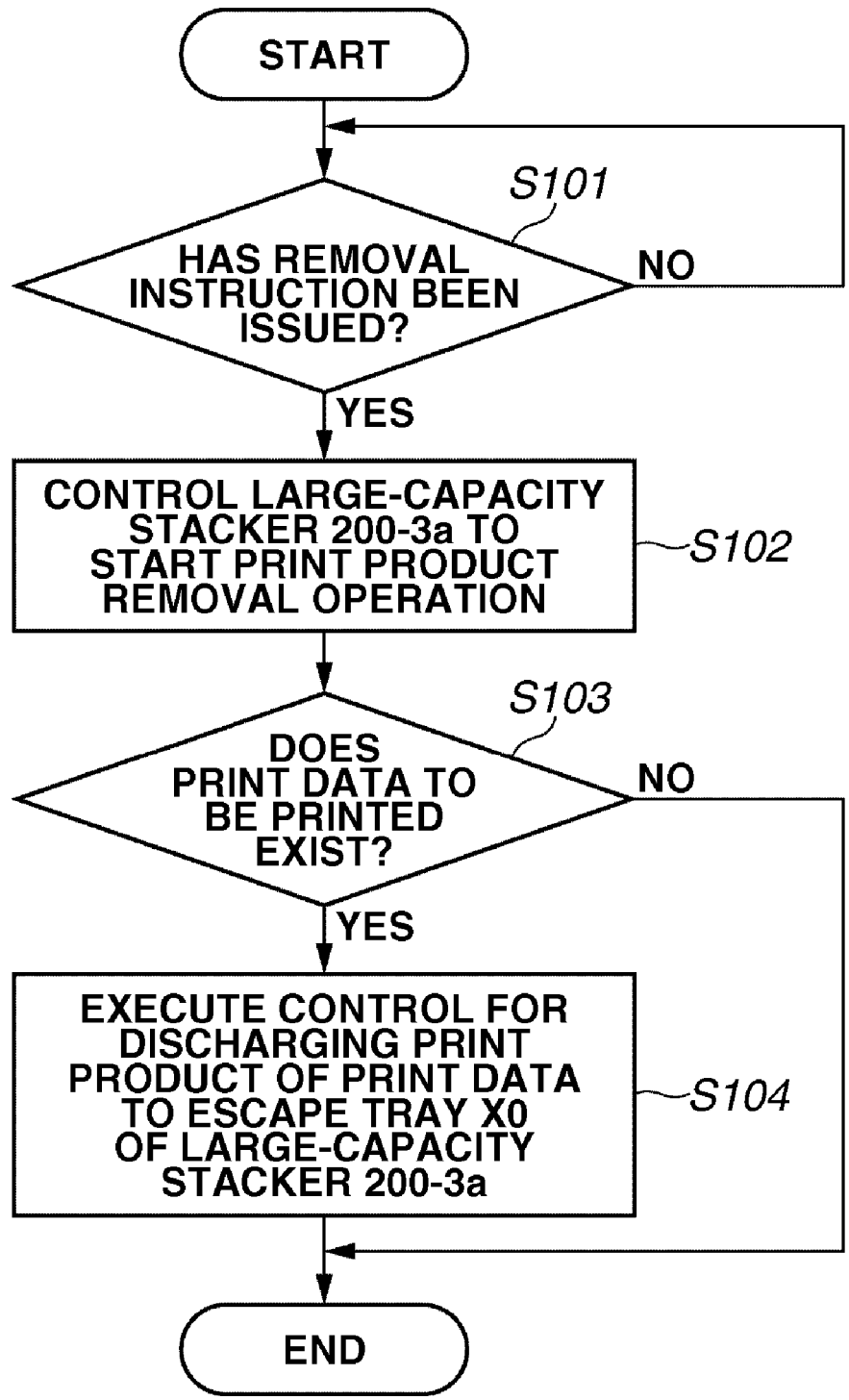
FIG. 9 is a flow chart illustrating an example of primary processing executed by the printing apparatus according to the first exemplary embodiment of the present invention.
Figure 10:
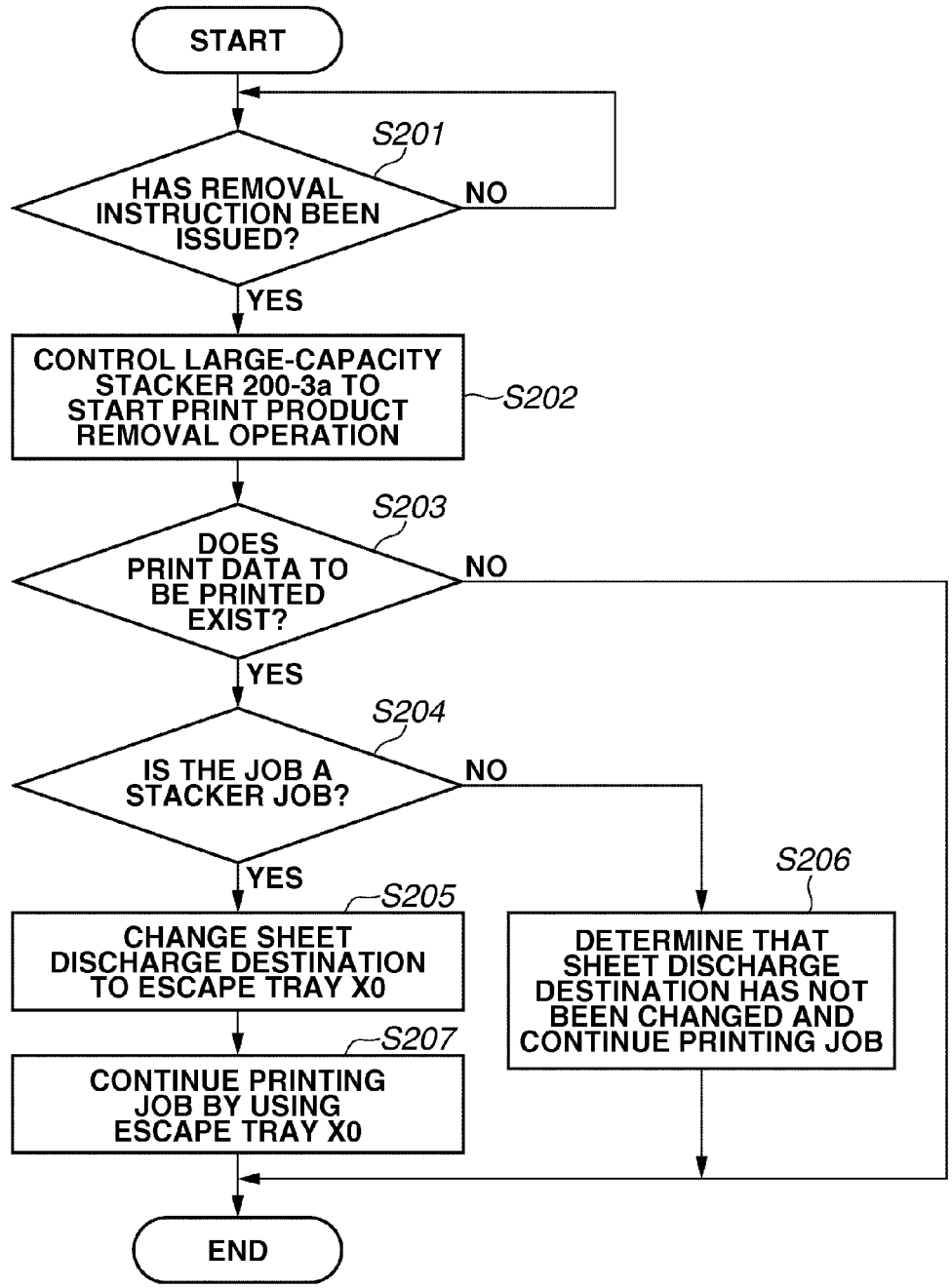
FIG. 10 is a flow chart illustrating an example of processing for controlling a sheet discharge destination during a stacker job that is currently being printed according to the first exemplary embodiment of the present invention.
Figure 14:
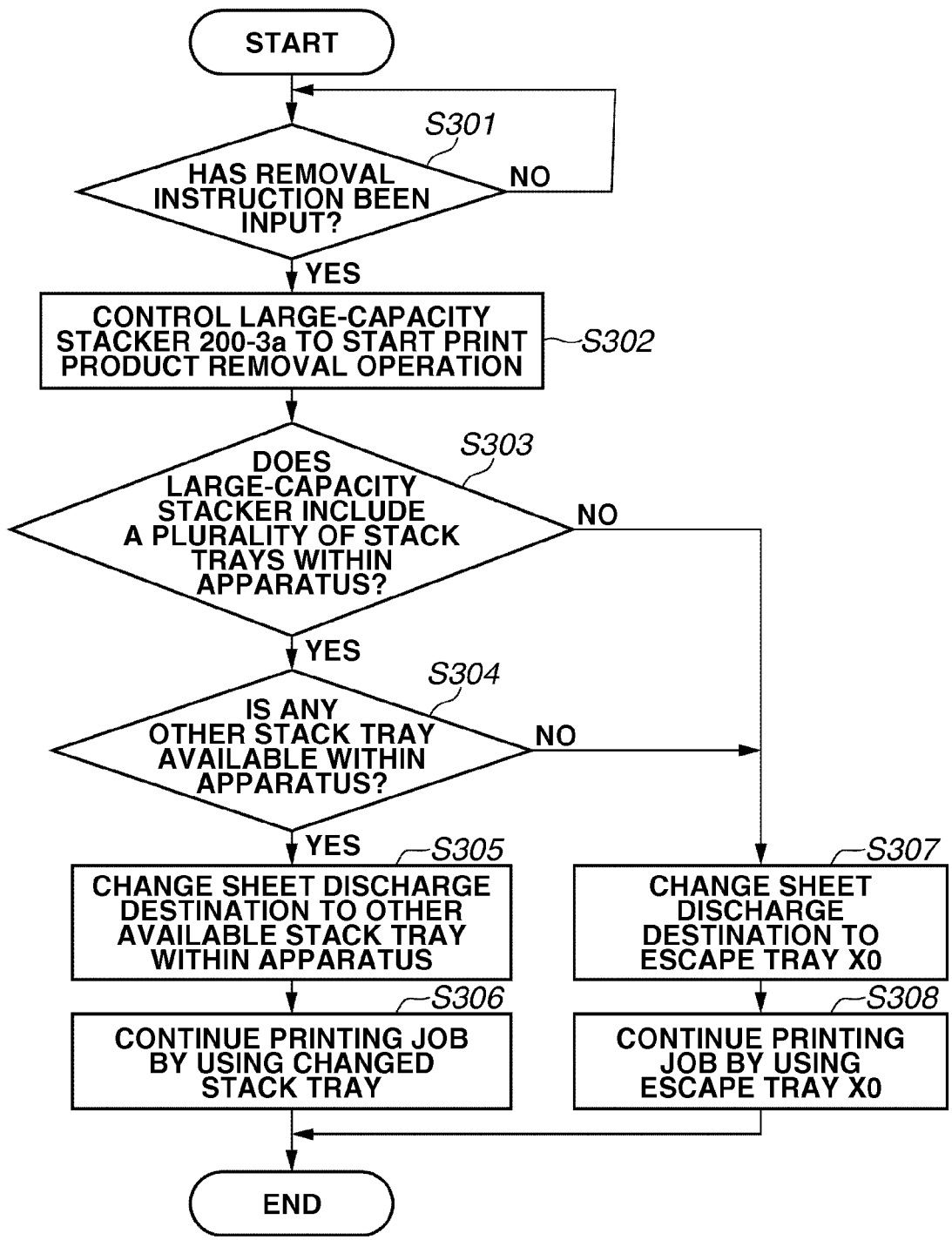
FIG. 14 is a flow chart illustrating an example of primary processing according to a second exemplary embodiment of the present invention.

A computer-executable program for executing processing in flow charts in FIGS. 9, 10, and 14 is stored on the ROM 207. The program is executed under control of the CPU 205a of the control unit 205. The CPU 205a executes processing in steps S101 through S104 (FIG. 9), steps S201 through S207 (FIG. 10), and steps S301 through S308 (FIG. 14).

The CPU 205a monitors whether a print request has been received via the operation unit 204 or the external I/F 202. When a print request has been received, the CPU 205a executes control for storing print data of the print job to be executed, on the HDD 209. After storing print data necessary for the designated printing, the print data of the print job is printed by the printer 203 (the printing apparatus 100 (FIG. 3)).

Referring to FIG. 9, in step S101, the CPU 205a monitors whether the user has pressed the removal instruction key 2001 and issued a removal instruction during printing with the printer 203. In the printing system 1000 having the configuration illustrated in FIG. 3, if a job to be printed by the printing apparatus 100 exists, the CPU 205a determines whether an instruction for removing a print result on the sheet discharge destination X (corresponding to the stack tray 2007 (FIG. 8)) inside the large-capacity stacker 200-3a has been input. If it is determined that an instruction for removing a print result to the sheet discharge destination X of the large-capacity stacker 200-3a has been input (YES in step S101), then the processing advances to step S102.

In step S102, the CPU 205a controls the large-capacity stacker 200-3a to start an operation for removing the print result 2003, which has been already discharged on the stack tray 2007 (corresponding to the sheet discharge destination X (FIG. 3)).

After determining that the removal instruction has been issued by the user, in step S103, the CPU 205a determines whether print data to be printed with the printer 203 exists on the HDD 209. If it is determined that print data to be printed with the printer 203 exists on the HDD 209 (YES in step S103), then the processing advances to step S104. In step S104, the CPU 205a executes control for discharging the print result of the print data on the sheet discharge destination X0, which is provided on the top portion of the large-capacity stacker 200-3a (FIG. 3).

In printing the print data with the printer 203 (the printing apparatus 100) in the printing system 1000 having the configuration illustrated in FIG. 3, the CPU 205a executes control for conveying the sheet having the print data printed thereon towards the sheet discharge destination X0 via a point A in FIG. 3 and discharging the sheet on the sheet discharge destination X0. The sheet discharge destination X0 (FIG. 3) corresponds to the escape tray X0 (FIG. 8).

The control in step S104 is executed on one consistent print job. More specifically, the control in step S104 is executed on a print job (a stacker job in the present exemplary embodiment) in which a series of print data including data of a plurality of pages is serially printed on a plurality of sheets page by page. The control in step S104 will be described in more detail below.

Suppose that the print job received by the printing apparatus 100 is a stacker job that requires printing of print data of four hundred pages and the sheet discharge destination X (FIG. 3). In addition, suppose that as a current operation status of the printing system 1000, first through 350th pages of the job have already been printed and that the print products thereof have been stacked on the sheet discharge destination X. Furthermore, suppose that the print job is currently being printed and that the rest of the pages are to be printed. Moreover, suppose also that the printing of the 351st page by the printer 203 is just about to start.

If, in the above-described state, an operator (the user) has pressed the removal instruction key 2001 and issued a removal instruction to remove the print products of three hundred and fifty pages of the job, which have already been stacked on the sheet discharge destination X at this time (at the time the printing of 351st page is just about to start), then after receiving the removal instruction input by the user, the CPU 205*a* controls the large-capacity stacker 200-3*a* to execute a removal operation for removing the print product of the job from the sheet discharge destination X by executing the processing in step S102. In addition, if the removal instruction has been input, the CPU 205*a* determines that print data to be printed with the printer 203 exists on the HDD 209 (YES in step S103). Furthermore, the CPU 205*a* executes control for executing the processing in step S104 on the job in parallel (at the same time) as the large-capacity stacker 200-3*a* executes the removal operation.

In this case, the printing of the other pages (namely, the 351st page through the 400th page) of the job is executed by the printing apparatus 100. The CPU 205*a* controls the printing system 1000 so that all of the print products of each page of the 351st page through the 400th page are to be serially discharged on the sheet discharge destination X0.

The sheet discharge destination control according to the present exemplary embodiment is applied to a case where a print job to be printed with the printing apparatus 100 exists at the time an instruction for removing the print product stacked on the stack tray (the sheet discharge destination X) inside the large-capacity stacker 200-3*a* is issued, as shown in the above-described example of the stacker job. In this case, the previously designated sheet discharge destination is not the escape tray X0 as described above. After the removal instruction has been issued, the CPU 205*a* changes the sheet discharge destination of the print result of the remaining print data to the escape tray X0.

In the present exemplary embodiment, the print data to be printed with the printer 203, which is stored on the HDD 209, is used as the remaining print data. On the other hand, if the sheet discharge destination designated at the time the removal instruction is issued is the escape tray X0, then the CPU 205*a* does not change the sheet discharge destination after the removal instruction is issued. The series of processing described above is executed in step S104 after having been determined "YES" in step S103.

On the other hand, if it is determined that print data to be printed with the printer 203 does not exist on the HDD 209 (NO in step S103), then the processing in the flow chart in FIG. 9 ends.

With the above-described configuration, in the present embodiment, while the printing of the job to be printed is currently executed on the printing apparatus 100, the CPU 205*a* controls the large-capacity stacker 200-3*a* to execute the removal operation for removing the print product of the already printed pages of the job from the sheet discharge destination X. In addition, in parallel to the removal operation, the CPU 205*a* controls the printing system 1000 (FIG. 3) so that the print results of the print data of the remaining (unprinted) pages of the currently printed job are discharged on the sheet discharge destination X0, which is different from the sheet discharge destination X.

As described above, in the present exemplary embodiment, the CPU 205*a* controls the entire operation of the printing system 1000 having the system configuration in which a plurality of sheet processing apparatuses 200 is connected to the printing apparatus 100 as illustrated in FIG. 3. Furthermore, the CPU 205*a* comprehensively executes control for printing the print data stored on the HDD 209, which can store print data of a plurality of print jobs, with the printer 203.

In the present embodiment, the CPU 205*a*, which executes the printing control, executes sheet discharge destination control according to the flow charts illustrated in FIGS. 9 and 10. In order to implement the control, in the present exemplary embodiment, the user can input an instruction for removing the print result existing within the stacker via the removal instruction key 2001 even if print data that has not been printed by the printer 203 (the printing apparatus 100) yet exists on the HDD 209. Furthermore, information input by the user operating the removal instruction key 2001 (the user interface for inputting the removal instruction) of the saddle stitch binding machine 200-3*c* is transmitted to the CPU 205*a* via an internal signal line. Moreover, the CPU 205*a* determines whether the above-described removal instruction has been input by the user in the state where the print data to be printed with the printer 203 exists on the HDD 209.

In addition, on condition that the removal instruction has been issued by the user when the print data to be printed with the printer 203 exists on the HDD 209, the CPU 205*a* executes control for discharging the print result of the print data on an output destination other than the sheet discharge destination X (FIG. 3). In the present exemplary embodiment, the CPU 205*a* controls the sheet discharge destination so that the escape tray X0, which is provided on the top portion of the large-capacity stacker 200-3*a* (FIG. 3) placed outside the stacker 200-3*a*, is used as the discharge destination other than the sheet discharge destination X. The present exemplary embodiment implements the method for implementing the above-described series of sheet discharge destination controls (discharge destination controls) with the printing system 1000.

With the above-described configuration, the present exemplary embodiment can execute the printing using the escape tray X0 with the printer 203 without performing the above-described removal operation for removing the print result existing within the large-capacity stacker 200-3*a*. Accordingly, the user can remove the print result from the stacker during printing. In addition, if the removal operation is to be performed, the present exemplary embodiment can prevent suspension of the printing of the print job and continue the printing of the current print job with the printer 203. As described above, the present exemplary embodiment can implement a method for allowing the user to remove a print product by a flexibly selectable operation while achieving and maintaining a high productivity in the printing system 1000.

In the present exemplary embodiment, as a primary example thereof, the above-described sheet discharge destination control (discharge destination control) is executed in a "stacker job", which is a print job in which a stacker has been previously designated by the user (operator) as the sheet discharge destination.

Meanwhile, an additional operation may be required to achieve the above-described effect of the present embodiment. In order to address this, the present exemplary embodiment further implements a method for preventing the above-described issue from arising while efficiently and appropriately achieving the above-described effect with another configuration based on the configuration as described above. This method will be described in detail below with reference to FIG. 10.

In this method, the printing system 1000 having the system configuration illustrated in FIG. 3 executes control for changing (switching) the sheet discharge destination with respect to a stacker job only. With respect to a job other than a stacker job, the method utilizes a sheet discharge destination designated in the job. As the job other than a stacker job, the above-described non-stacker job, such as a gluing binding job or a saddle stitch binding job, is used.

In this method, the printing can be continued without stopping an operation regardless of the type of a currently printed job (stacker job or non-stacker job) when the user inputs an instruction for removing the print result stacked inside the large-capacity stacker 200-3a. The processing according to the flowchart in FIG. 10 is applied in substitution for the processing in the flow chart in FIG. 9. However, the content of the processing according to the flow chart in FIG. 9 is partially applied in the processing according to the flow chart in FIG. 10.

Referring to FIG. 10, in steps S201 and S202, the CPU 205a executes processing similar to that in steps S101 and S102 (FIG. 9). In step S203, the CPU 205a determines whether a print job in progress exists. If it is determined that no print job in progress exists (NO in step S203), then the processing ends. On the other hand, if it is determined that the print job in progress exists (YES in step S203), then the processing advances to step S204. In step S204, the CPU 205a determines whether the print job in progress is a stacker job.

If it is determined that the print job in progress is a stacker job (YES in step S204), then the processing advances to step S205. In step S205, the CPU 205a changes (switches) the sheet discharge destination utilized in the stacker job from the stack tray 2007 to the escape tray X0. In step S207, the CPU 205a continues the printing of the job by using the escape tray X0. The printing of the job is continued while the removal operation with the large-capacity stacker 200-3a continues.

On the other hand, if the print job in progress is a "non-stacker job" (NO in step S204), then the processing advances to step S206. In step S206, the CPU 205a does not change the sheet discharge destination of the print result 2003 and continues the printing of the non-stacker job. Accordingly, the CPU 205a executes control for continuing the printing of the non-stacker job with the printing apparatus 100 even during the removal operation by the large-capacity stacker 200-3a in the printing system 1000 having the configuration illustrated in FIG. 3. A gluing binding job and a saddle stitch binding job are used as the print job that is the non-stacker job in the printing system 1000 having the configuration illustrated in FIG. 3.

The control applied as the control in step S206, which is executed on the non-stacker job, will be described in detail below as an example.

Suppose that while a gluing binding job has been printed by the printer 203, the operator has pressed the removal instruction key 2001 to remove the print result of a stacker job, which is a job other than the gluing binding job and has already been printed previous to the gluing binding job. When the removal instruction issued via the removal instruction key 2001 is received, the CPU 205a executes control for descending the sheet discharge destination X inside the large-capacity stacker 200-3a (the stack tray 2007 (FIG. 8)) towards the dolly 2009. In addition, the CPU 205a executes control for releasing the locked state of the front cover 2002 of the large-capacity stacker 200-3a so that the operator can open the front cover 2002 by hand. By controlling the stacker to execute the above-described series of removal operations according to the removal instruction from the user, the present exemplary embodiment allows the user to remove the print result of the stacker job, printing of which has been completed prior to the current print job in gluing binding, from the stack tray X (the sheet discharge destination X).

In the present exemplary embodiment, the CPU 205a executes control for continuing the printing of the current non-stacker job (gluing binding job in this case) in the printing system 1000 in parallel to a series of removal operations for an already printed stacker job. The CPU 205a executes control for continuing the printing of the gluing binding job with the printing apparatus 100 even if the front cover 2002 (FIG. 7) of the large-capacity stacker 200-3a has been left open in the printing system 1000 having the configuration illustrated in FIG. 3.

In the printing system 1000 having the configuration illustrated in FIG. 3, the CPU 205a executes control for conveying the sheet printed by the printing apparatus 100 (the printer 203) into the gluing bookbinding machine 200-3b via the sheet conveyance path (via the points A and B (FIG. 3)) within the large-capacity stacker 200-3a even in a state where the front cover 2002 of the large-capacity stacker 200-3a has been left open. As described above, the CPU 205a executes control for continuing the printing (the printing by the printer 203 and the conveyance of the sheet into the gluing bookbinding machine 200-3b) of the gluing binding job while the front cover 2002 of the large-capacity stacker 200-3a has been left open. In addition, the CPU 205a executes control for executing gluing binding processing on the sheet of the job within the gluing bookbinding machine 200-3b and discharging the processed sheet on the sheet discharge destination Y even if the front cover 2002 has been left open.

In the printing system 1000 having the configuration illustrated in FIG. 3, the control executed to the above-described gluing binding job, which is a non-stacker job, is applied also to a saddle stitch binding job. More specifically, during printing of a saddle stitch binding job in the printing apparatus 100, the above-described control can also be applied to a case where the series of removal operations of a stacker job are performed that has already been printed previous to the saddle stitch binding.

In this case, the CPU 205a executes control for continuing the printing of the currently printed saddle stitch binding job by the printing apparatus 100 without stopping the job in parallel to the operation for removing the print result of the stacker job with the large-capacity stacker 200-3a. Thus, in the printing system 1000 having the configuration illustrated in FIG. 3, the CPU 205a executes control for continuing the printing of the currently printed saddle stitch binding job even while the front cover 2002 (FIG. 7) of the large-capacity stacker 200-3a has been left open.

In the printing system 1000 having the configuration illustrated in FIG. 3, the CPU 205a executes control for conveying the sheet printed by the printing apparatus 100 (the printer 203) into the saddle stitch binding machine 200-3c via the sheet conveyance path (via the points A through C (FIG. 3)) within the large-capacity stacker 200-3a even while the front cover 2002 of the large-capacity stacker 200-3a has been left open. As described above, the CPU 205a executes control for continuing the printing (the printing by the printer 203, and the conveyance of the sheet into the saddle stitch binding machine 200-3c) of the saddle stitch binding job even while the front cover 2002 of the large-capacity stacker 200-3a has been left open. Further, CPU 205*a* executes control to perform the desired sheet processing within the saddle stitch binding machine 200-3*c*, and discharge the processed sheet to a discharge destination (one of Z-1, Z-2, and Z-3) even in the above described state (i.e., the front cover 2002 of the large-capacity stacker 200-3*a* has been left open).

As described above, the present exemplary embodiment includes a method for continuing the printing of a non-stacker job even when the front cover 2002 of the large-capacity stacker 200-3*a* (FIG. 3) is open (has been left open). The processing in steps S204 and S206 is applied as one of such methods. More specifically, when a job currently is being printed by the printer 203 as described above, if the user inputs an instruction for removing the print result stacked inside the large-capacity stacker 200-3*a* via the removal instruction key 2001, then the processing advances to step S204. In step S204, the CPU 205 determines whether the currently printed job is a stacker job. If it is determined that the currently printed job is a stacker job (YES in step S204), then the processing advances to step S206. In step S206, the CPU 205*a* does not change the sheet discharge destination of the currently printed non-stacker job and controls the printing system 1000 to continue the printing of the job by using the sheet discharge destination that has been previously designated in the job.

As described above, in the printing system 1000 having the configuration illustrated in FIG. 3, when the user inputs an instruction for removing the print result stacked within the large-capacity stacker 200-3*a* during a gluing binding job, the CPU 205*a* controls the printing system 1000 to continue using the current sheet discharge destination Y of the job and continue the printing of the gluing binding job by using the sheet discharge destination Y. Furthermore, in the printing system 1000 having the configuration illustrated in FIG. 3, if the user inputs an instruction for removing the print result stacked within the large-capacity stacker 200-3*a* during a saddle stitch binding job, the CPU 205*a* does not change the sheet discharge destination (one of the sheet discharge destinations Z-1 through Z-3) of the job. Moreover, the CPU 205*a* executes control for continuing the printing of the saddle stitch binding job by using the sheet discharge destination.

By executing the above-described method, the present exemplary embodiment can prevent a new problem related to a non-stacker job from occurring, in a case of achieving the effect of the present exemplary embodiment related to the stacker job described above with reference to FIG. 9. For example, when removing the print result stacked within the large-capacity stacker 200-3*a*, a problem may arise that post processing (gluing binding or saddle stitch binding) that the operator has previously set on a non-stacker job may be cancelled without notifying to the operator and the sheet discharge destination may be changed to another sheet discharge destination that is not desired by the operator. The present exemplary embodiment can prevent a problem like this from occurring.

The CPU 205 executes the series of sheet discharge destination control processing described above if the result of the determination in step S204 is "NO" and thus the processing has advanced to step S206. The present exemplary embodiment not only includes the above-described method but also includes a method for implementing the processing in steps S205 and S207. The following control is executed in the processing in steps S205 and S207.

Suppose that in the printing system 1000 having the configuration illustrated in FIG. 3, the printing apparatus 100 (the printer 203) currently executes the printing of a stacker job. Furthermore, suppose that the operator has pressed the removal instruction key 2001 to remove the print result that has already been discharged on the sheet discharge destination X (corresponding to the stack tray 2007 (FIG. 8)) from the large-capacity stacker 200-3*a*. In this case, the CPU 205*a* executes control for descending the stack tray 2007 within the large-capacity stacker 200-3*a* towards the dolly 2009. In addition, the CPU 205*a* executes control for releasing the locked state of the front cover 2002 of the large-capacity stacker 200-3*a* so that the operator can open the front cover 2002 by hand.

the CPU 205*a* controls the saddle stitch binding machine 200-3*c* to execute the series of removal operations described above to allow the operator to remove the print result of the currently printed stacker job itself from the sheet discharge destination X (corresponding to the stack tray 2007 (FIG. 8)) within the saddle stitch binding machine 200-3*c*.

The above-described method can be applied in the following state. The above-described method can be applied when in a stacker job for printing one thousand pages, eight hundred pages have already been printed and the remaining two hundred pages are currently printed and when the operator desires to remove the printed sheets of the eight hundred pages from the sheet discharge destination X.

As described above, in the present exemplary embodiment, in performing a removal operation for a currently printed stacker job, the CPU 205*a* executes control for continuing the printing of the stacker job with the printing apparatus 100 (the printer 203) in parallel to (at the same time as) executing the removal operation. However, in the present exemplary embodiment, if the print job currently printed on the printer 203 is not a non-stacker job but a stacker job when the operator inputs the removal instruction, then the CPU 205 executes control for changing the sheet discharge destination previously designated in the job to different another sheet discharge destination.

For example, in the printing system 1000 having the configuration illustrated in FIG. 3, the CPU 205 executes control for changing the sheet discharge destination of the currently printed stacker job from the sheet discharge destination X within the large-capacity stacker 200-3*a* (the stack tray 2007 (FIG. 8)) to the sheet discharge destination X0 within the large-capacity stacker 200-3*a* (the escape tray X0 (FIG. 8)). Furthermore, the CPU 205 controls the printing apparatus 100 (the printer 203) to continue the printing of the stacker job by using the sheet discharge destination designated by the change of the sheet discharge destination.

By executing the above-described method, in the printing system 1000 having the configuration illustrated in FIG. 3, for example, the CPU 205*a* executes control for conveying the sheet printed on the printer 203 onto the escape tray X0 via the point A (FIG. 3) on the conveyance path inside the large-capacity stacker 200-3*a* even while the front cover 2002 of the large-capacity stacker 200-3*a* is open (has been left open). Furthermore, the CPU 205*a* controls the printing system 1000 to continue the printing operation of the currently printed stacker job by using the escape tray X0 even while the front cover 2002 has been left open. As described above, in performing a series of removal operations for a currently printed stacker job, the CPU 205*a* controls the printing system 1000 to continue the printing of the currently printed stacker job in parallel to the removal operations of the currently printed stacker job.

In the present exemplary embodiment, the processing in steps S204, S205, and S207 is executed as one of the methods for continuing the printing of a stacker job in the printing system 1000 even when the front cover 2002 of the stacker has been left open. More specifically, when the user inputs a removal operation by pressing the removal instruction key 2001 in a state where a job currently printed by the printer 203 exists, then the CPU 205 determines the type of the job (a stacker job or a non-stacker job) in S204. If it is determined that the job is a stacker job, then the processing advances to step S205. Then, the CPU 205 changes the sheet discharge destination of the currently printed stacker job from the stack tray X to the escape tray X0. Furthermore, the CPU 205 controls the printing system 1000 to continue the printing of the job by using the changed sheet discharge destination (escape tray) X0.

Accordingly, in the printing system 1000 having the configuration illustrated in FIG. 3, if the user has instructed removing of a print result that has already been printed in a currently printed stacker job, the printing of the currently printed stacker job can be continued by changing the sheet discharge destination of the job. As described above, the CPU 205 executes control to continue the series of the printing operations by changing the sheet discharge destination of the job during printing of the stacker job even when the front cover 2002 of the large-capacity stacker 200-3a has been left open.

With the above-described configuration, the present exemplary embodiment can continue the printing of a stacker job itself without stopping the printing, whose print result is to be removed. Accordingly, the present exemplary embodiment can obtain the effect (effect of continuing printing during an operation for removing a print product from the stacker) achieved by applying the control in step S206 on a non-stacker job, even with respect to a stacker job.

In method described above with reference to FIG. 10, in the present exemplary embodiment, the CPU 205a determines whether a job currently printed by the printer 203 exists when the user has input an instruction for removing the print result stacked inside the large-capacity stacker 200-3a via the user interface. If it is determined that a currently printed job exists when the user has input the above-described instruction, the CPU 205a determines whether the currently printed job is a stacker job for discharging the print result on the stack tray X (FIG. 3). If it is determined that the job is a stacker job, then the CPU 205a changes the sheet discharge destination of the job to the escape tray X0, which is applied as another predetermined discharge destination, and continues the printing of the job by the printer 203.

On the other hand, if it is determined that the job currently printed when the user has input the above-described instruction is not a stacker job but a non-stacker job for discharging the print result on the discharge destination of another sheet processing apparatus (the gluing bookbinding machine 200-3b or the saddle stitch binding machine 200-3c (FIG. 3)) connected to the large-capacity stacker 200-3a, then the CPU 205a does not change the sheet discharge destination of the job and continues the printing of the job by the printer 203. Furthermore, regardless of the type of the job that is currently printed (regardless of whether the job is a stacker job or a non-stacker job), whose print data is stored on the HDD 209 when the removal instruction has been input by the user, the CPU 205a executes the control in common to both the stacker job and the non-stacker job. More specifically, the CPU 205a executes control for continuing the printing by the printer 203 without suspension even while the front cover 2002 has been left open as described above in the three exemplary cases (cases of the gluing binding job, the saddle stitch binding job, and the stacker job).

With the above-described configuration, the present exemplary embodiment can prevent suspension of printing even when the user has issued an instruction for removing the print result 2003, which has been discharged on the large-capacity stacker 200-3a, in a state where print data to be printed by the printer 203 exists. More specifically, the present exemplary embodiment can prevent a problem from arising such that the printing of the print data to be printed may be suspended or delayed due to an instruction to remove print result from the user. Accordingly, even when the user has instructed removing of the print result during printing of a stacker job, the present exemplary embodiment can allow the user to remove the print result 2003 while continuing the printing of the currently printed job by changing the sheet discharge destination from the stack tray 2007 to the escape tray X0.

In addition, the CPU 205a executes control for selecting, as the other sheet discharge destination changed from the current sheet discharge destination, a sheet discharge destination that is located at a position at which the user can recognize that the print result 2003 exists. More specifically, if a stacker having sheet discharge destinations inside and outside the apparatus is used, the CPU 205a changes the sheet discharge destination from the stack tray 2007 to the escape tray X0, which is a sheet discharge destination outside the stacker and has close relationship with the original sheet discharge destination, instead of changing the sheet discharge destination to the sheet discharge destination Y of the gluing bookbinding machine 200-3b or to either one of the sheet discharge destinations Z-1 through Z-3 of the saddle stitch binding machine 200-3c. Then, the CPU 205a executes control for executing printing by using the escape tray X0. Accordingly, the present exemplary embodiment can allow the user to easily recognize that the discharged print result 2003 exists.

Meanwhile, in the present exemplary embodiment, the above-described control is executed to one currently printed print job. However, the present invention is not limited to this embodiment. More specifically, the sheet discharge destination control according to the flow chart in FIG. 10 can be executed also to a job waiting to be printed ("print waiting job"). That is, when a job different from a currently printed print job is waiting for printing, if the above-described removal instruction is input in this state, the CPU 205a changes the sheet discharge destination to a different sheet discharge destination before starting the printing of the print waiting job.

A method for implementing the sheet discharge destination control on a print waiting job will be described in detail below with reference to FIG. 11. However, the present exemplary embodiment is not necessarily configured by this method. More specifically, the present exemplary embodiment can be applied to any method including the above-described processing according to the flow chart in FIG. 9 and/or FIG. 10.

FIG. 11 illustrates an example of a job status screen 1201 displayed on the LCD unit of the touch panel unit 401. Suppose that a job C, which is a stacker job, is waiting to be printed while a job A is currently printed as indicated on the job status screen 1201. If the user inputs a removal instruction in this state, the control unit 205 changes the sheet discharge destination of the print waiting job C from the stack tray X (the stack tray 2007) to another sheet discharge destination (the escape tray X0).

Furthermore, when a plurality of stacker jobs waiting to be printed exists on the HDD 209, it is useful if the sheet discharge destinations of the stacker jobs are changed to another sheet discharge destination collectively at the same time when the user inputs a removal instruction. Suppose that the user has input a removal instruction while the job A is currently printed as illustrated in FIG. 11. In this case, the CPU 205a changes the sheet discharge destinations of jobs C, E, and F, which are stacker jobs waiting for printing, from the stack tray X (the stack tray 2007) to the escape tray X0 at the same time. In the example illustrated in FIG. 11, the sheet discharge destinations of the stacker jobs C, E, and F are changed to the escape tray X0 collectively at the same time before starting printing of the same.

As a result, the job A (FIG. 11), which is a gluing binding job, is printed by using the sheet discharge destination Y (FIG. 3) provided inside the gluing bookbinding machine 200-3b. When the printing of the job A is completed, a job B, which is a gluing binding job, is printed and a sheet printed in the job B is discharged on the sheet discharge destination Y of the gluing bookbinding machine 200-3b, similar to the case of the job A. After printing the job B, the stacker job C is printed and a sheet printed in the job C is discharged on the escape tray X0 instead of discharging the same on the stack tray X.

A next job D, which is a saddle stitch binding job, is printed and a sheet printed in the job D is discharged on either one of the sheet discharge destinations the sheet discharge destinations Z-1 through Z-3. After completing the printing of the job D, the stacker jobs E and F are printed and sheets printed during the jobs E and F are discharged on the escape tray X0.

If the sheet discharge destination cannot be automatically changed due to a trouble such as a device error (tray-full, for example) in step S205 (FIG. 10), it is useful if the printing of the print job utilizing the stack tray X is suspended.

In the method illustrated in FIGS. 9, 10, and 14 according to the present exemplary embodiment, when the user operates the removal instruction key 2001 and inputs a removal instruction, the CPU 205a automatically changes the sheet discharge destination of a stacker job that is currently printed and/or waiting to be printed on condition that the removal instruction is input. Furthermore, the CPU 205a executes control for automatically executing the printing by using the changed sheet discharge destination.

As described above, in the present exemplary embodiment, the CPU 205a executes control of the printing system 1000 to automatically execute the above-described operations without requiring an operator's operation after the operator has input a removal instruction via the user interface. Suppose that in the printing system 1000 having the configuration illustrated in FIG. 3, in a state where a stacker job is currently printed by the printing apparatus 100, the operator has input an instruction for removing the print result already printed in the job while the printing of the job is currently executed by the printing apparatus 100. In this case, in parallel to the operation for removing the print result on the saddle stitch binding machine 200-3c, the CPU 205a changes the sheet discharge destination of the stacker job from the stack tray X to the sheet discharge destination X0 and continues the printing of the job with the printing apparatus 100 by using the sheet discharge destination X0.

In the above-described present embodiment, the control unit 205 executes control of the printing system 1000 to automatically execute the series of operations (changing of the sheet discharge destination and continuation of the printing) for the currently printed stacker job in parallel to the removal operation if the user inputs the removal instruction.

Furthermore, in the printing system 1000 having the configuration illustrated in FIG. 3, when a non-stacker job currently printed by the printing apparatus 100 exits, if the operator has input an instruction for removing the print result of another stacker job that has already been printed, from the stack tray X in this state, then the CPU 205a executes control for continuing the printing of the job by the printing apparatus 100 without changing the sheet discharge destination of the currently printed non-stacker job in parallel to the operation for removing the print result on the saddle stitch binding machine 200-3c.

In the above-described present embodiment, the CPU 205a executes control of the printing system 1000 for automatically executing the series of operations (operations for continuing the printing without changing the predetermined sheet discharge destination) for the currently printed non-stacker job in parallel to the removal operation if the user has input a removal instruction.

In the printing system 1000 having the configuration illustrated in FIG. 3, when a stacker job is waiting to be printed by the printing apparatus 100, the operator has input an instruction for removing the print result of another stacker job that has already been printed from the stack tray X. In this case, the CPU 205a executes control of the printing apparatus 100 for starting printing of the print waiting non-stacker job after changing the sheet discharge destination of the non-stacker job in parallel to the operation for removing the print result on the saddle stitch binding machine 200-3c.

In the above-described present embodiment, the CPU 205a executes control of the printing system 1000 for automatically executing the series of operations (operations for starting printing after changing the sheet discharge destination) for non-stacker job waiting for the printing in parallel to the removal operation if the user has input a removal instruction.

As described above, the printing system 1000 according to the present embodiment can allow the operator to input a removal instruction with one simple operation to cause the printing system 1000 to serially and automatically execute the operations to be executed according to the removal instruction without being required to perform a further operation in all of the above-described three types of control.

The above-described methods according to the present embodiment is intended to the POD system that has the configuration described above with reference to FIG. 1. The above-described methods are useful in a print environment in which it is primarily important to efficiently process a plurality of print jobs with a high productivity to satisfy the needs and desire of a customer with the various component units and devices illustrated in FIG. 1. In addition, the above-described methods achieve an effect of efficiently processing a print job while reducing the load of the operator who operates the printing system 1000 under the above-described print environment.

The present exemplary embodiment can provide the operator of the printing system 1000 with the following operation environment by implementing the above-described methods in the printing system 1000. Suppose that the operator who operates the printing system 1000 under the print environment of the POD system illustrated in FIG. 1 desires to process a job including a large number of prints of 1,200 sheets in the following manner with the following intention.

(a): The print job including 1,200 sheets is printed in the printing system 1000 as a stacker job (b): Then, the print results of the job, which have been discharged on the stack tray 2007 of the large-capacity stacker 200-3a are removed therefrom and are conveyed to the cutting machine 109 by using the dolly 2009. After setting the print results on the cutting machine 109, processing for cutting edges of the print result sheets (the sheets printed by the printer 203) is executed to finish the appearance of the print results of the job.

(c): Since the cutting machine 109 can cut up to 1,000 sheets at the same time, it is necessary to cut the 1,200 print result sheets of the job by executing two cutting operations even if all the print results of the job are carried to the cutting machine 109 after printing the 1,200 print result sheets in the printing system 1000.

(d): Accordingly, the efficiency of processing the job can be improved by processing the job in the following manner. After printing 1,000 sheets of the job in the printing system 1000, the 1,000 print result sheets are removed from the large-capacity stacker 200-3a. Then, the removed print results are carried to the cutting machine 109 on the dolly 2009. The cutting machine 109 executes cutting of the 1,000 sheets. During these operations, the printing system 1000 continues the printing of the remaining two hundred sheets.

(e): The operator returns from the installation location of the cutting machine 109 to the printing system 1000 to return the dolly 2009, which has now become empty, to the printing system 1000 while setting the 1,000 sheets of print result on the cutting machine 109 to execute cutting on the same.

(f): When the operator returns to the installation location of the printing system 1000, the remaining two hundred sheets of print result of the job have already been discharged on the escape tray X0 of the large-capacity stacker 200-3a. The operator removes the two hundred printed sheets from the escape tray X0 and returns to the installation location of the cutting machine 109 and sets the two hundred sheets thereon. Then, the cutting machine 109 executes cutting of the two hundred print result sheets. All operations necessary for processing the job end by performing the above-described series of operations.

(g): Considering the above-described operations (a) through (f), it is more efficient to remove the print result of the job from the large-capacity stacker 200-3a when 1,000 sheets are completely printed and cut the removed 1,000 print result sheets than to process 1,200 print result sheets on the cutting machine 109 after printing 1,200 sheets in the printing system 1000. Accordingly, the operator desires to utilize the printing system 1000 so that the operations necessary for the job are to be completed in a shortest possible operation time by improving the efficiency of executing the entire workflow necessary for the job (the series of operations from printing by the printing system 1000 to cutting by the cutting machine 109).

It is necessary for the operator having the above-described intention and desire to efficiently perform various flow processes in a short period of time. In order to execute the above-described operation, it is necessary for the operator to walk among the installation locations of the apparatuses in the print environment of the POD system illustrated in FIG. 1. Considering the above-described operator's desire and necessary operations, the present exemplary embodiment can implement a method that can satisfy the operator's desire to address such a situation. The methods for controlling the sheet discharge destination described above with reference to FIGS. 9 and 10 can be used as one of the methods for implementing the configuration for satisfying the operator's desire.

In the example described above, it is only necessary for the operator who desires to execute the operations (a) through (g) in the manner described therein to only start the printing of the stacker job in the printing system 1000 and input a removal instruction by operating the removal instruction key 2001 after the printing of 1,000 sheets has been completed. After performing this simple operation, the operator can remove the 1,000 sheets of print result of the job from the large-capacity stacker 200-3a and convey the removed print results to the cutting machine 109 by using the dolly 2009. Furthermore, the operator can cause the printing system 1000 to continue printing of the remaining two hundred sheets by using the sheet discharge destination X0 (FIG. 3) while the operator is in the installation location of the cutting machine 109.

The printing system 1000 according to the present exemplary embodiment can implement a method for efficiently executing the above-described flow process with the processing in the flow charts illustrated in FIGS. 9 and 10. According to the present embodiment, in the printing system 1000 having the configuration illustrated in FIG. 3, it is not necessary for the operator to walk between the installation locations of the printing apparatus 100 and the large-capacity stacker 200-3a too many times to execute the above-described flow processing. Accordingly, the operator can perform the above-described flow processing with a simple operation of inputting a removal instruction via the removal instruction key 2001.

As described above, the printing system 1000 according to the present exemplary embodiment can implement a method for satisfying various customer needs in the print environment of the POD system illustrated in FIG. 1 with a high productivity and operability. Although the above-described methods are intended to improve the user convenience and operability, it is not always necessary to provide the method with all the above-described configurations. More specifically, the printing system 1000 can include a configuration that is partially different from the above-described configuration. It is also useful in the printing system 1000 according to the present exemplary embodiment if the CPU 205a does not automatically change the sheet discharge destination of the stacker job when the operator has input a removal instruction but changes the sheet discharge destination to the sheet discharge destination X0 after confirming with the operator whether to apply this change.

In the following description, a configuration will be described for discharging the print result of the stacker job on the escape tray X0 after confirming with the user (operator) whether to apply the change in the sheet discharge destination to the escape tray X0. The processing according to this configuration can be implemented in the following manner.

Figure 12:
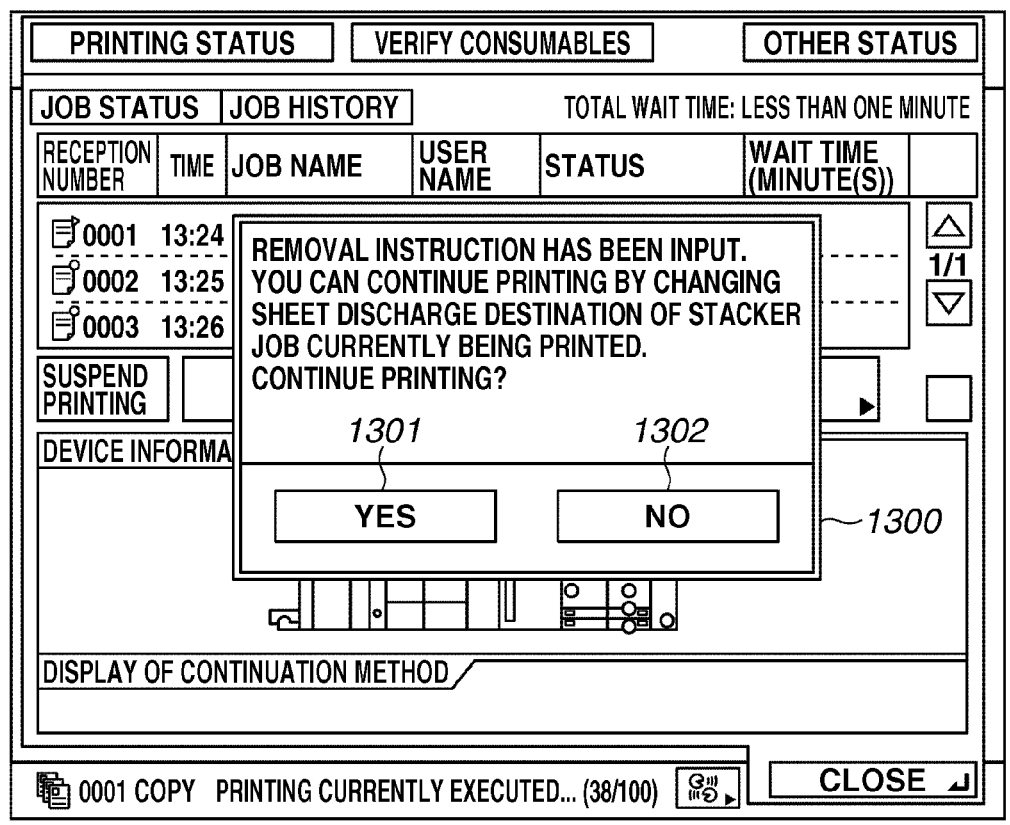
FIG. 12 illustrates an example of a display of a sheet discharge destination change confirmation screen according to the first exemplary embodiment of the present invention.

The CPU 205a additionally executes a sheet discharge destination confirmation step between the processing in steps S204 and S205 (FIG. 10). More specifically, if the result of the determination in step S204 is "YES", then the CPU 205a displays a sheet discharge destination change confirmation screen (user interface screen) 1300 (FIG. 12) on the LCD unit of the touch panel unit 401. If the user has pressed a "YES" button 1301 for designating the change of sheet discharge destination to the escape tray X0 (YES in the sheet discharge destination change confirmation step), then, the CPU 205a determines that the user has confirmed the change of sheet discharge destination and then the processing advances to step S205.

On the other hand, if the user does not permit the change of sheet discharge destination (if the user has pressed a "NO" button 1302) (NO in the sheet discharge destination change confirmation step), then the CPU 205a reserves the printing of the print result that utilizes the sheet discharge destination X (suspends the printing).

If the printing has been suspended, it is also useful that the printing is resumed by utilizing the sheet discharge destination X after having confirmed that the removal operation has ended with returning of the dolly 2009 to the large-capacity stacker 200-3a or closing of the front cover 2002. Furthermore, if a plurality of sheet discharge destinations, which are candidates of the "other sheet discharge destination" (change-target sheet discharge destination), exists within the large-capacity stacker 200-3a, it is also useful that the CPU 205a displays all the candidate sheet discharge destinations on the sheet discharge destination change confirmation screen 1300 (FIG. 12) to allow the user to select one therefrom.

In the present exemplary embodiment, the CPU 205*a* of the control unit 205 executes the control described above with reference to FIGS. 11 and 12 (including the display and the control of operation of the user interface). However, the present embodiment is not limited to this embodiment. More specifically, a part of the above-described control can be executed by another CPU different from the control unit 205.

Now, a second exemplary embodiment of the present invention will be described below. In the above-described first exemplary embodiment, the large-capacity stacker 200-3*a* includes one stack tray within the apparatus. In the present exemplary embodiment, the sheet discharge destination control is applied on the large-capacity stacker 200-3*a* that can include a plurality of stack trays. In the present embodiment, either one of two types of stackers (a first type and a second type described below) can be selectively used as the large-capacity stacker 200-3*a*.

Figure 13:
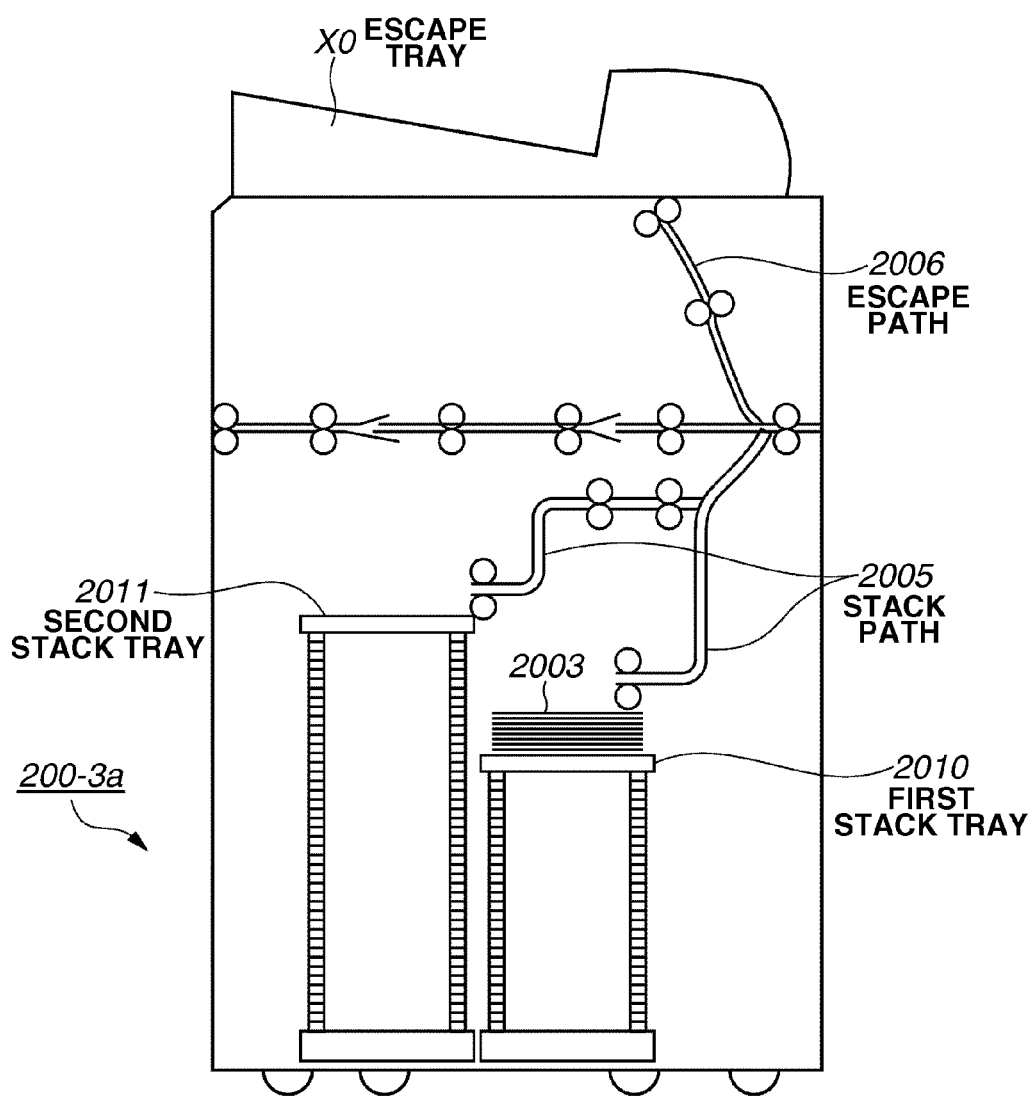
FIG. 13 is a cross section illustrating an example of a second type stacker according to the first exemplary embodiment of the present invention.

As the first type stacker, the large-capacity stacker 200-3*a* can include one stack tray within the apparatus as illustrated in FIG. 8. FIG. 13 is a cross section illustrating an example of the second type stacker according to the present embodiment. As the second type stacker, the large-capacity stacker 200-3*a* can include a plurality of stack trays (sheet discharge destinations) within the apparatus. Referring to FIG. 13, the large-capacity stacker 200-3*a*, which is the second type stacker, includes a first stack tray 2010 and a second stack tray 2011.

The second type stacker has the configuration similar to that of the first type stacker except for the inner configuration (i.e., except that the second type stacker includes a plurality of stack trays inside the apparatus). The external appearance of the second type stacker is illustrated in FIG. 7. More specifically, the second type stacker also includes a removal instruction key (corresponding to the removal instruction key 2001 (FIG. 7)) for inputting an instruction for removing the print result discharged on the stack tray within the apparatus, similar to the first type stacker. Furthermore, the second type stacker also includes the front cover 2002 and the escape tray X0, which is provided on the top portion of the apparatus.

FIG. 14 is a flow chart illustrating an example of primary processing according to the present exemplary embodiment. The processing in the flow chart in FIG. 14 corresponds to the processing in the flow chart in FIG. 9 in the above-described first exemplary embodiment. Referring to FIG. 14, in steps S301 and S302, the CPU 205*a* executes the processing in steps S101 and S102 (FIG. 9). In step S303, the CPU 205*a* determines the type of the large-capacity stacker 200-3*a* (determines whether the large-capacity stacker 200-3*a* is the second type stacker including a plurality of stack trays inside the apparatus). The determination in step S303 can be executed according to information indicating that each type stacker has been connected to the printing apparatus 100, which can be automatically transmitted to the CPU 205*a*.

If it is determined that the type of the large-capacity stacker 200-3*a* connected to the printing apparatus 100 is the first type stacker (NO in step S303), then the processing advances from step S303 to step S307 and beyond. In steps S307 and S308, the CPU 205*a* executes the processing similar to that executed in steps S205 and S207 (FIG. 10), respectively. More specifically, in step S307, the CPU 205*a* changes the sheet discharge destination used in the stacker job from the stack tray 2007 (the sheet discharge destination X (FIG. 3)) to the escape tray X0. In step S308, the CPU 205*a* continues the printing of the job by using the escape tray X0. The CPU 205*a* continues the printing of the job while the large-capacity stacker 200-3*a* executes the removal operation. Then, the processing ends.

On the other hand, if it is determined that the type of the large-capacity stacker 200-3*a* connected to the printing apparatus 100 is the second type stacker (YES in step S303), then the processing advances to step S304. In step S304, the CPU 205*a* determines whether any other stack tray is available among those existing within (inside) the second type stacker. More specifically, the CPU 205*a* determines whether, between the first stack tray 2010 (FIG. 13) and the second stack tray 2011 (FIG. 13), the stack tray which has not been designated as the sheet discharge destination of the print result 2003 of the job, is currently available. If no tray-full has occurred or if no print result 2003 has been stacked on the stack tray, the CPU 205*a* determines that the stack tray is available. In this regard, the operator may not desire to stack the print result of the job together with those of another job even if a tray-full has not occurred. Accordingly, it is also useful if the following configuration is applied to satisfy the above-described desire of the operator. That is, the CPU 205*a* determines that a tray is available if it is determined that no print result has been stacked thereon (the current stacking quantity is "0"). Various modifications of the present embodiment such as the one described above can be applied in the present invention.

As the method for confirming the status of each stack tray inside the second type stacker, various configurations can be applied. In this regard, it is also useful if the CPU 205*a* acquires the presence or absence of the print result on each of a plurality of stack trays inside the second type stacker. Furthermore, if it is determined that print results exist on each of the plurality of stack trays, the CPU 205*a* may acquire the current stacking quantity of the print results on each of the plurality of stack trays. The information can be detected by and transmitted to the CPU 205*a* from a sensor (not illustrated) included in the stacker. The CPU 205*a* can execute the determination in step S304 with the above-described configuration.

If it is determined that no other available stack tray exists inside the second type stacker (NO in step S304), then the processing advances to step S307 and beyond. In steps S307 and S308, the CPU 205*a* executes the processing similar to that executed in steps S205 and S207 (FIG. 10). In this case, the CPU 205*a* changes the sheet discharge destination of the currently printed stacker job to the escape tray X0 (FIG. 13), which is provided on the top portion of the second type stacker outside the apparatus. The CPU 205*a* controls the printing system 1000 to continue the printing of the stacker job by using the escape tray X0. Then, the processing ends.

On the other hand, if any other available stack tray exists inside the second type stacker (YES in step S304), then the processing advances to step S305. In step S305, the CPU 205*a* changes the sheet discharge destination of the currently printed stacker job to the other available stack tray. In step S306, the CPU 205*a* executes control of the printing system 1000 to continue the printing of the job by utilizing the other available stack tray. The CPU 205*a* executes the processing common to those performed in step S306 and step S308. More specifically, the CPU 205*a* controls the printing system 1000 to continue the printing of the stacker job while the large-capacity stacker 200-3*a* executes the removal operation.

Now, the stacker connected to the printing apparatus 100 as the second type in the printing system 1000 having the configuration illustrated in FIG. 3 that includes two stack trays (FIG. 13) will be described in detail below. The following example can be implemented by executing the processing in steps S305 and S306. Suppose that in the printing system 1000 having the configuration illustrated in FIG. 3, a currently printed stacker job exists when the operator inputs the removal instruction for removing the print result stacked inside the stacker (FIG. 13) (the large-capacity stacker 200-3a). Furthermore, suppose that the first stack tray 2010 (FIG. 13) has been previously designated by the operator with respect to the stacker job. In addition, suppose that the second stack tray 2011 (FIG. 13) is available when the operator inputs the removal instruction.

In this case, the CPU 205a changes the sheet discharge destination of the job from the first stack tray 2010 (FIG. 13) to the second stack tray 2011 (FIG. 13) if the operator inputs the removal instruction. Furthermore, the CPU 205a controls the printing apparatus 100 to continue the printing of the job by using the second stack tray 2011 provided inside the second type stacker. The above-described processing is executed if it is determined "YES" in step S304 and then the processing has advances to steps S305 and S306.

As another example of the above-described case, suppose that the operator has previously designated the second stack tray 2011 as the sheet discharge destination of the stacker job. Furthermore, suppose that the second stack tray 2011 is available when the operator inputs the removal instruction. In this case, the CPU 205a changes the sheet discharge destination of the stacker job from the second stack tray 2011 to the first stack tray 2010. Furthermore, the CPU 205a controls the printing apparatus 100 to continue the printing of the job by using the first stack tray 2010 provided inside the second type stacker.

Now, processing to be executed if the processing has advanced from step S304 to steps S307 and S308 (NO in step S304) will be described in detail below. Suppose that the sheet discharge destination of the stacker job is the first stack tray 2010 (FIG. 13) and that the second stack tray 2011 is not available as the current operation status. In this case, the CPU 205a changes the sheet discharge destination of the stacker job to the escape tray X0 of the stacker, which is provided on the top portion outside the apparatus, if the operator inputs the removal instruction. Furthermore, the CPU 205a controls the printing apparatus 100 to execute the printing of the job by utilizing the escape tray X0 of the second type stacker, which is provided on the top portion outside the apparatus. The above-described processing is executed if the processing advances from step S304 to steps S307 and beyond.

Furthermore, as yet another example of the above-described case, suppose that the operator has designated the second stack tray 2011 as the sheet discharge destination of the stacker job and that the first stack tray 2010 is not currently available. In this case, the CPU 205a changes the sheet discharge destination of the job from the second stack tray 2011 to the escape tray X0, which is provided on the top portion of the stacker outside the apparatus, if the operator inputs the removal instruction. Furthermore, the CPU 205a controls the printing apparatus 100 to execute the printing of the job by utilizing the escape tray X0 of the second type stacker, which is provided on the top portion of the stacker outside the apparatus. In the present exemplary embodiment, the control common to all of the above-described four cases is executed.

More specifically, the CPU 205a controls the printing system 1000 to start the removal operation by the second type stacker if the operator inputs the removal instruction. The CPU 205a controls the printing apparatus 100 to continue the printing of the stacker job by using the sheet discharge destination that has been set by the processing for changing the sheet discharge destination in step S305 or S307 even if the front cover 2002 of the second type stacker has been left open. During the removal operation in the second type stacker, only the stack tray on which the print results to be removed according to the removal instruction are stacked, is descended onto the level of the dolly 2009. The CPU 205a executes control for moving the available stack tray to a level at which the print results conveyed from the printing apparatus 100 can be stacked.

With the above-described configuration, either one of the first stack tray 2010 (FIG. 13) and the second stack tray 2011 (FIG. 13) is set onto the dolly 2009 and the operator can perform the operation for carrying the print results stacked on the tray. In addition, while the operator performs the print result carrying operation, the CPU 205a controls the printing system 1000 to continue the printing of the stacker job by using the other tray.

Furthermore, in all of the above-described four cases, the CPU 205a controls the printing apparatus 100 to continue the printing of the job by automatically (without requiring the operator to execute further operation other than inputting an instruction) changing the sheet discharge destination of the job and using the sheet discharge destination set by the sheet discharge destination changing processing in parallel to the removal operation if the operator has input the removal instruction. However, the present exemplary embodiment is not limited to this embodiment. More specifically, it is also useful if the CPU 205a executes the control (control for changing the sheet discharge destination and continuing the printing of the job by using the sheet discharge destination set by the sheet discharge destination changing processing) after confirming whether to change the sheet discharge destination via the user interface, similar to the above-described first embodiment.

In the present exemplary embodiment, the second type stacker including two stack trays inside thereof is used. However, the present exemplary embodiment is not limited to this embodiment. More specifically, it is also useful if the second type stacker includes three or more stack trays in implementing the above-described sheet discharge destination control. In this case, if one or more "other stack tray(s)", which are different from the sheet discharge destination that has been designated in the job, exist inside the apparatus, then the CPU 205a changes the sheet discharge destination to one of the "other stack tray" when the operator has input the removal instruction. On the other hand, if no "other stack tray" exists, the CPU 205a changes the sheet discharge destination of the job to the escape tray X0. In this case, it is also useful that when a plurality of other available stack trays exists, the priority of selecting the sheet discharge destination is previously set by the operator. Furthermore, it is also useful if the priority of selecting the sheet discharge destination in this state is selected by the user (operator) every time the operator executes the operation in the printing system 1000.

In addition, in the present exemplary embodiment, when the dolly 2009, which has been withdrawn from the stacker to remove the print result 2003, is set inside the large-capacity stacker 200-3a again, the CPU 205a executes processing for resetting (restoring) the sheet discharge destination. More specifically, the CPU 205a automatically returns the currently set sheet discharge destination to the original sheet discharge destination X, which was designated as the sheet discharge destination before the operator inputs the removal instruction. However, it is also useful if the CPU 205a returns the sheet discharge destination from the currently set sheet discharge destination to the sheet discharge destination X after confirming with the user whether to return the sheet discharge destination from the currently set sheet discharge destination to the sheet discharge destination X instead of automatically changing the sheet discharge destination to the previous sheet discharge destination X and continuing the printing.

Figure 15:
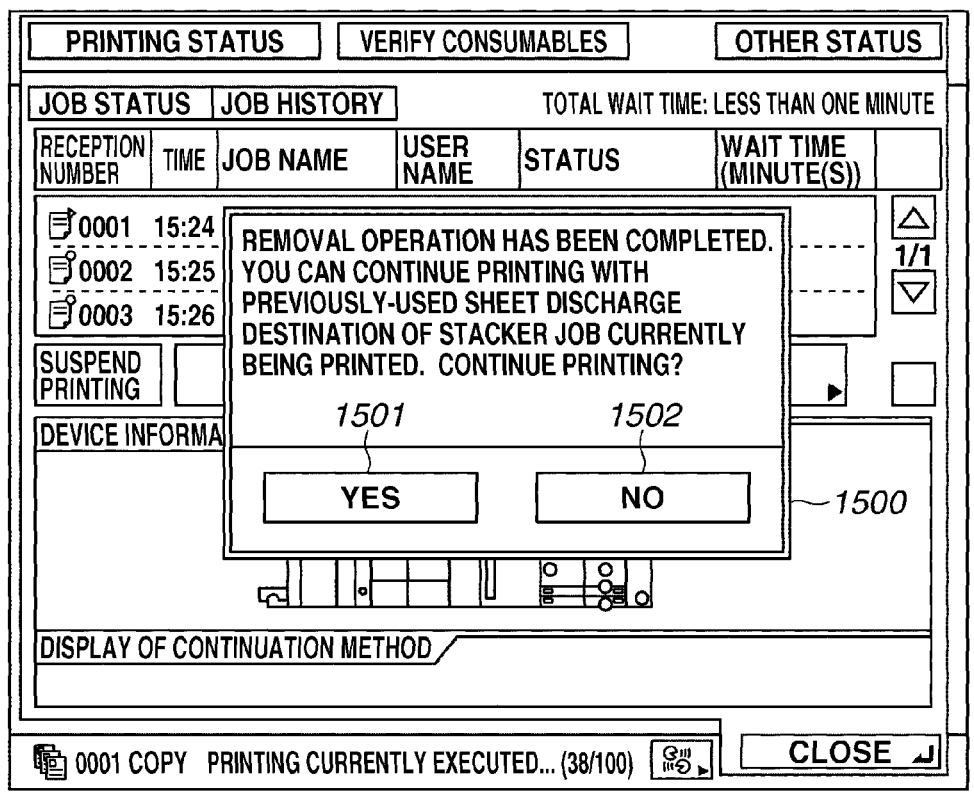
FIG. 15 illustrates an example of a display of a screen for confirming restoration of sheet discharge destination according to the second exemplary embodiment of the present invention.

For example, the sheet discharge destination that was set before, is the destination X and the sheet discharge destination has been changed to the escape tray X0 according to the input removal instruction. In this case, when the user has completed the operation for removing the print result 2003 and reset the dolly 2009 inside the stacker, the CPU 205a executes control for displaying a sheet discharge destination restoration confirmation screen (user interface screen) 1500 (FIG. 15) on the LCD unit of the touch panel unit 401.

If the user has designated returning of the sheet discharge destination to the sheet discharge destination X (if the user has pressed an "YES" button 1501 (FIG. 15)), then the CPU 205a changes (returns) the sheet discharge destination to the sheet discharge destination X, which is provided inside the stacker. Then, the printing is executed by the sheet discharge destination X. On the other hand, if the user does not designate the returning of the sheet discharge destination to the sheet discharge destination X (if the user has pressed a "NO" button 1502 (FIG. 15)), then the CPU 205a executes control for continuing the printing of the print job by using the escape tray X0.

With the above-described configuration, the present exemplary embodiment can achieve the effect of the first exemplary embodiment. In addition, when the large-capacity stacker 200-3a includes a plurality of stack trays inside the apparatus, if one or more stack tray(s) different from the sheet discharge destination that has been designated by the user as the sheet discharge destination of the job exist inside the apparatus, then the present exemplary embodiment can continue the printing of the job and discharge the print result of the job on the stack tray. Accordingly, the present exemplary embodiment can effectively prevent the suspension of printing from occurring.

In each of the first and the second exemplary embodiments, the removal instruction key 2001 of the large-capacity stacker 200-3a is used as the user interface for instructing the large-capacity stacker 200-3a to execute the removal operation. However, the present invention is not limited to this embodiment. More specifically, the operation unit 204, which is a user interface provided in a printing apparatus including the printer 203 or an interface of an external apparatus capable of communicating with the printing apparatus can be used.

In the above-described case where the interface of the external apparatus is used, a CPU of the external apparatus can also implement the entire or a part of various determination processing and control for implementing the print control and/or the sheet discharge destination control, which are implemented by the CPU 205a by executing the method described above with reference to FIGS. 3 through 15. More specifically, it is also useful if the external apparatus that can remotely control the printing system 1000 is provided with all of or a part of the above-described configuration of the exemplary embodiments of the present invention.

As the external apparatus like this, an apparatus that can execute data communication with the apparatuses such as the scanner 102, the server PC 103, the client PC 104, the paper folding machine 107, the case binding machine 108, and the cutting machine 109, which are illustrated in FIG. 1, can be used in the exemplary embodiments of the present invention. An external apparatus capable of executing data communication with the printing apparatus 100 via the network 101 can be used as the above-described external apparatus.

The present invention can also be achieved by providing a system or an apparatus with a computer-readable storage medium storing program code of software implementing the functions of the embodiments and by reading and executing the program code stored in the computer-readable storage medium with a computer of the system or the apparatus (a CPU or a micro processing unit (MPU)).

In this case, the program code itself, which is read from the computer-readable storage medium, implements the functions of the embodiments described above, and accordingly, the computer-readable storage medium storing the program code constitutes the present invention.

As the program code, computer-executable program code for executing the processing flows illustrated in FIGS. 9, 10, and 14 according to the exemplary embodiments of the present invention can be used. In addition, program code necessary for displaying various user interface screens described above can be used as the program code.

As the computer-readable storage medium for supplying such program code, a flexible disk, a hard disk, a magneto-optical disk, a compact disc read only memory (CD-ROM), a compact disc recordable (CD-R), a compact disc rewritable (CD-RW), a digital versatile disk (DVD (DVD-recordable (DVD-R), DVD-rewritable (DVD-RW))), a magnetic tape, a nonvolatile memory card, and a ROM, for example, can be used. Alternatively, such program code can be downloaded via a network.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the computer-readable storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

As described above, the present invention is not limited to the above-described exemplary embodiments thereof. Accordingly, various modifications (including an effective combination of the above-described embodiments) can be applied according to the purpose of the present invention and are not excluded from the scope of the present invention. With respect to the plurality of methods described above with reference to FIGS. 9, 10, and 14, either of a configuration including the combination of all the methods, a configuration including one of the methods only, and a configuration including two of the methods can be applied as the exemplary embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-122182 filed May 8, 2008, which is hereby incorporated by reference herein in its entirety.

What is claimed is:

1. A printing system, comprising:
  a stacking control unit configured to control to stack a sheet printed by executing a job on a stacking unit provided inside a stacker, wherein the stacker includes a cover that can be opened and closed; and a control unit configured to enable the cover to be opened in a case where a predetermined instruction is input by a user; via an operation unit which is provided with the stacker, wherein the stacking control unit controls to output, in a case where the predetermined instruction is input while the job is executed, the sheet printed by executing the job to an output destination different from the stacking unit.

2. The printing system according to claim 1, wherein if the predetermined instruction is input in a case where a print waiting job in which the stacking unit is set as the output destination exists in a storage unit, the stacking control unit changes the output destination of the sheet to be output by executing the print waiting job to the output destination different from the stacking unit.

3. The printing system according to claim 1, wherein the stacking unit includes a detachable carriage, wherein the carriage can be withdrawn from the stacker under control of the control unit in a state that the cover is left open, and wherein, in a case where the predetermined instruction is input while the job is executed, and the job controlled by the stacking control unit to output the sheet to the output destination different from the stacking unit is being executed, if the carriage withdrawn from the stacker is set into the stacker, then the stacking control unit controls to stack the sheet printed by executing the job controlled to output the sheet to the output destination on the stacking unit.

4. The printing system according to claim 1, further comprising:

a display control unit configured to control to display a screen for selecting an output destination different from the stacking unit on a display unit if the predetermined instruction is input while the job is executed, wherein, in a case where the output destination different from the stacking unit is selected by a user, the stacking control unit controls to stack the sheet printed by executing the job, to the output destination selected via the screen displayed on the display unit under control of the display control unit.

5. The printing system according to claim 4, wherein the stack control unit suspends printing for the job until the output destination different from the stacking unit is selected via the screen displayed on the display unit under control of the display control unit.

6. The printing system according to claim 1, wherein the output destination different from the stacking unit is an escape tray provided outside the stacker.

7. A printing system comprising:

a stacking control unit configured to control to stack a sheet printed by executing a job on a stacking unit of a plurality of stacking units provided inside a stacker, wherein the stacker includes a cover that can be opened and closed; and a control unit configured to enable the cover to be opened in a case where a predetermined instruction is input by a user, wherein the stacking control unit controls to stack, in a case where the predetermined instruction is input while the job is executed, the sheet printed by executing the job, to another stacking unit of the plurality of stacking units provided inside the stacker.

8. A printing system, comprising:

a stacking control unit configured to control to stack a sheet printed by executing a job on a stacking unit provided inside a stacker, wherein the stacker includes a cover that can be opened and closed; and a control unit configured to enable the cover to be opened in a case where a predetermined instruction is input by a user via an operation unit which is provided with an apparatus different from the stacker, wherein the stacking control unit controls to output, in a case where the predetermined instruction is input while the job is executed, the sheet printed by executing the job to an output destination different from the stacking unit.

9. A method for controlling a printing system, the method comprising:

controlling to stack a sheet printed by executing a job on a stacking unit provided inside a stacker, wherein the stacker includes a cover that can be opened and closed;

enabling the cover to be opened in a case where a predetermined instruction is input by a user via an operation unit which is provided with the stacker; and controlling to output, in a case where the predetermined instruction is input while the job is executed, the sheet printed by executing the job to an output destination different from the stacking unit.

10. The method according to claim 9, further comprising:

changing the output destination of the sheet to be output by executing the print waiting job to the output destination different from the stacking unit, if the predetermined instruction is input in a case where a print waiting job in which the stacking unit is set as the output destination, exists in a storage unit.

11. The method according to claim 9, wherein the stacking unit includes a detachable carriage, and wherein the carriage can be withdrawn from the stacker in a state that the cover is left open, the method further comprising:

in a case where the predetermined instruction is input while the job is executed, and the job controlled to output the sheet to the output destination different from the stacking unit is being executed, if the carriage withdrawn from the stacker is set into the stacker, controlling to stack the sheet printed by executing the job controlled to output the sheet to the output destination on the stacking unit.

12. The method according to claim 9, further comprising:

controlling to display a screen for selecting an output destination different from the stacking unit, on a display unit if the predetermined instruction is input in a case where the job is executed; and in a case where the output destination different from the stacking unit is selected by a user, controlling to stack the sheet printed by executing the job, to the output destination selected via the screen displayed on the display unit.

13. The method according to claim 12, wherein printing of the output job is suspended until the output destination different from the stacking unit is selected via the screen displayed on the display unit.

14. The method according to claim 9, wherein the output destination different from the stacking unit is an escape tray provided outside the stacker.

15. A method for controlling a printing system, the method comprising:

controlling to stack a sheet printed by executing a job on a stacking unit of a plurality of stacking units provided inside a stacker, wherein the stacker includes a cover that can be opened and closed;

enabling the cover to be opened in a case where a predetermined instruction is input by a user; and in a case where the predetermined instruction is input while the job is executed, controlling to stack the sheet printed by executing the job, to another stacking unit of the plurality of stacking units provided inside the stacker.

16. A method for controlling a printing system, the method comprising:

controlling to stack a sheet printed by executing a job on a stacking unit provided inside a stacker, wherein the stacker includes a cover that can be opened and closed;

enabling the cover to be opened in a case where a predetermined instruction is input by a user via an operation unit which is provided with an apparatus different from the stacker; and controlling to output, in a case the predetermined instruction is input while the job is executed, the sheet printed by executing the job to an output destination different from the stacking unit.

17. A non-transitory computer-readable storage medium storing a computer-executable program for controlling a printing system, the computer-executable program comprising:

a code to control to stack a sheet printed by executing a job on a stacking unit provided inside a stacker, wherein the stacker includes a cover that can be opened and closed;

a code to enable the cover to be opened in a case where a predetermined instruction is input by a user via an operation unit which is provided with the stacker; and in a case where the predetermined instruction is input while the job is executed, controlling to output the sheet printed by executing the job to an output destination different from the stacking unit.

* * * * *